US008806995B2

(12) United States Patent
Kapoor et al.

(10) Patent No.: US 8,806,995 B2
(45) Date of Patent: Aug. 19, 2014

(54) HIGH-PRECISION MICRO/NANO-SCALE MACHINING SYSTEM

(75) Inventors: Shiv G. Kapoor, Champaign, IL (US); Keith Allen Bourne, Urbana, IL (US); Richard E. DeVor, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 957 days.

(21) Appl. No.: 12/877,863

(22) Filed: Sep. 8, 2010

(65) Prior Publication Data

US 2011/0132169 A1 Jun. 9, 2011

Related U.S. Application Data

(60) Provisional application No. 61/240,417, filed on Sep. 8, 2009.

(51) Int. Cl.
*B23B 1/00* (2006.01)
*B23Q 17/09* (2006.01)

(52) U.S. Cl.
USPC .................. 82/1.11; 82/118; 82/134; 82/158

(58) Field of Classification Search
USPC .................. 82/1.11, 118, 123, 133, 134, 158; 407/66, 112; 73/104, 105; 850/33, 42, 850/52, 53, 62, 63; 700/42, 44, 61
See application file for complete search history.

(56) References Cited

U.S. PATENT DOCUMENTS

| | | | | |
|---|---|---|---|---|
| 5,461,907 | A * | 10/1995 | Tench et al. | 73/105 |
| 5,662,015 | A * | 9/1997 | Bassett et al. | 82/158 |
| 5,802,937 | A * | 9/1998 | Day et al. | 82/1.11 |
| 6,237,452 | B1 * | 5/2001 | Ludwick et al. | 82/12 |
| 6,809,306 | B2 * | 10/2004 | Ando et al. | 250/201.3 |
| 7,204,662 | B1 * | 4/2007 | Long et al. | 407/34 |
| 7,367,242 | B2 * | 5/2008 | Xi et al. | 73/862.625 |
| 7,524,152 | B2 * | 4/2009 | Honegger et al. | 409/235 |
| 7,908,028 | B2 * | 3/2011 | Takahashi et al. | 700/170 |
| 2006/0260388 | A1 * | 11/2006 | Su et al. | 73/105 |
| 2007/0250187 | A1 * | 10/2007 | Heertjes | 700/44 |

OTHER PUBLICATIONS

Adams, D.P., et al., "Microgrooving and microthreading tools for fabricating curvilinear features", Journal of the International Societies for Precision Engineering and Nanotechnology, 24 (2000) 347-356.

Bourne, K.A., et al., "Development of a High-Performance AFM Probe-Based Scribing Process", ICOMM Sep. 11, 2008 No. 46.

(Continued)

*Primary Examiner* — Daniel Howell
*Assistant Examiner* — Nicole N Ramos
(74) *Attorney, Agent, or Firm* — Greer, Burns & Crain, Ltd.

(57) ABSTRACT

A high precision micro/nanoscale machining system. A multi-axis movement machine provides relative movement along multiple axes between a workpiece and a tool holder. A cutting tool is disposed on a flexible cantilever held by the tool holder, the tool holder being movable to provide at least two of the axes to set the angle and distance of the cutting tool relative to the workpiece. A feedback control system uses measurement of deflection of the cantilever during cutting to maintain a desired cantilever deflection and hence a desired load on the cutting tool.

18 Claims, 29 Drawing Sheets

(56) References Cited

OTHER PUBLICATIONS

Fang, T., et al., "Machining characterization of the nano-lithography process using atomic force microscopy", Nanotechnology 11 (2000) 181-187.

Fanuc, 2008, "Super nano machine exploring nano field: Fanuc Robonano α-)0*i*B", www.fanuc.co/jp/en/product/robonano/index.htm.

Goss, S.H., et al., "Mechanical lithography using a single point diamond machining", J. Vac. Sci. Technol. B 16(3), May/Jun. 1998.

Maeda, J., et al., "Micro-machining using 1.55μm band fiber pulse laser with 10kW peak power", in Proc. of Fifth International Symposium on Laser Precision Microfabrication, Proceedings of SPIE vol. 5562, pp. 501-505 (2004).

Picard, Y.N., "Focused ion beam-shaped microtools for ultra-precision machining of cylindrical components", Precision Engineering 27 (2003), pp. 59-69.

Santinacci, L., et al., "Atomic Force Microscopy-Induced Nanopatterning of Si(100) Surfaces", Journal of the Electrochemical Society, vol. 148, No. 9, pp. C640-C646, 2000.

Sumomogi, T., et al., "Nanoscale layer removal of metal surfaces by scanning probe microscope scratching", J. Vac. Sci. Technol. B 13(3), May/Jun. 1995.

Tseng, A.A., et al., "Nanofabrication by scanning probe microscope lithography: A review", J. Vac. Sci. Technol. B 23(3), May/Jun. 2005.

Vasile, M.J., et al., "Scanning probe tips formed by focused ion beams", Rev. Sci. Instrum. 62 (9), Sep. 1991.

* cited by examiner

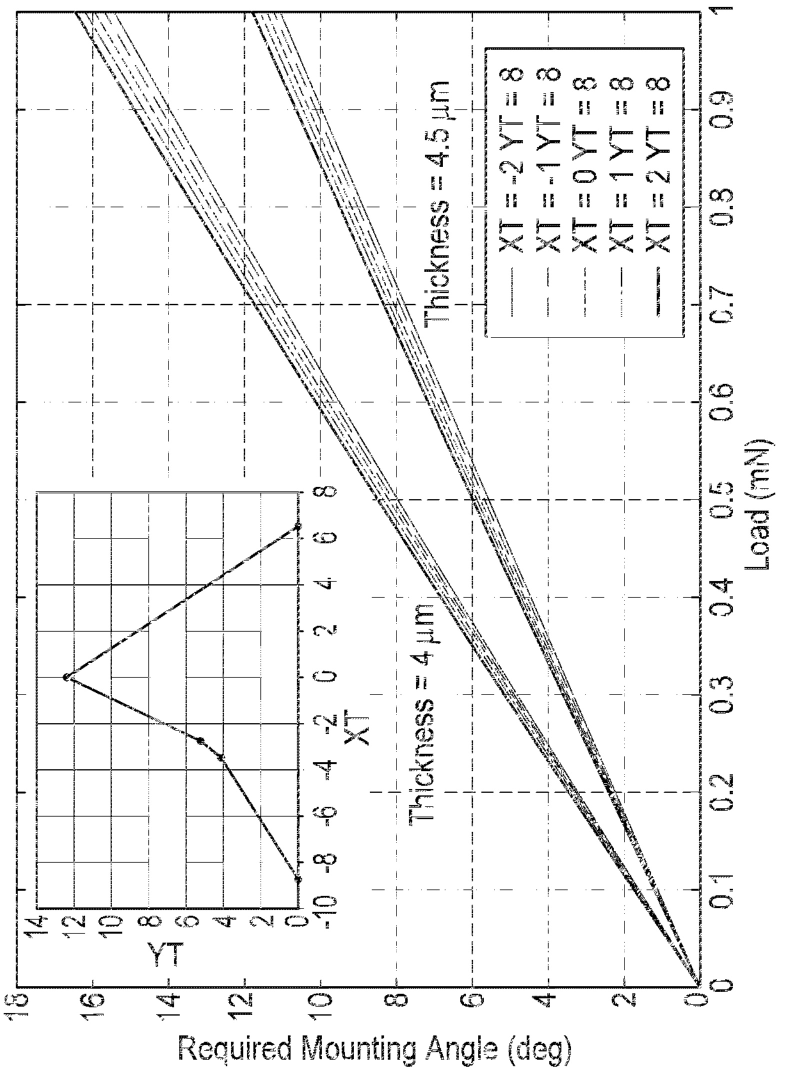
FIG. 13
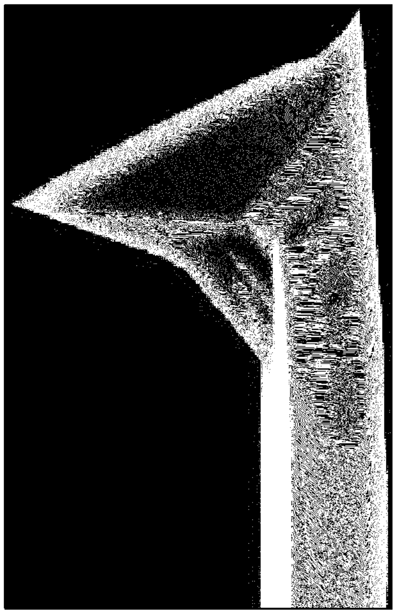

HIGH-PRECISION MICRO/NANO-SCALE MACHINING SYSTEM

STATEMENT OF GOVERNMENT INTEREST

This invention was made with Government support under Contract No. DMI-0328162 awarded by National Science Foundation and under Contract Numbers DE-FG02-07ER46453 and DE-FG02-04ER46471 awarded by the Department of Energy. The Government has certain rights in the invention.

PRIORITY CLAIM AND REFERENCE TO RELATED APPLICATION

This application claims the benefit of U.S. Provisional Application Ser. No. 61/240,417, filed Sep. 8, 2009, under 35 U.S.C. §119, which is incorporated by reference herein.

FIELD OF THE INVENTION

A field of the invention is microfabrication and nanofabrication.

BACKGROUND OF THE INVENTION

Microfabrication and nanofabrication processes to form features such as channels and trenches often involve complex masking and etching steps. These processes, while successful, require highly expensive equipment and procedures to conduct micro- or nanofabrication steps.

Some efforts have been made to find simpler ways to conduct microfabrication and nanofabrication. Microscale scribing, for instance, can be used to produce grooves, or pockets including grooves, of sub-micron depths. As an example, Atomic Force Microscopes (AFMs) have been used to perform nanofabrication by using the scanning probe as a tool. A typical AFM scribing process drags an AFM tip along a surface to cause a mechanical or chemical change in the surface. AFM probes including $Si_3N_4$ probes, diamond tipped probes, and diamond coated silicon probes have been used for scribing. AFM scribing has been used to create grooves with sub-micron depths in materials including Al, Au—Pd, $SiO_2$, Ni, and Si. AFMs allow for highly precise control of scribing forces normal to a workpiece, and they provide a way to perform in-situ metrology of the resulting grooves following production.

However, the working volumes of these AFMs tend to be very limited. Further, the length of the scribes is typically limited to between a few microns and tens of microns, and the speed of the piezoelectric stages of these machines (between 0.006 and 1.2 mm/min, with a maximum speed typically in the range of 1.2-1.5 mm/min) is slower than would be desirable for production purposes, particularly for larger but still highly accurate grooves, including those with curvilinear shapes. The number of passes used to scribe a single groove can be, for instance, as high as one thousand. The low speed and short scribing length result, in part, from limitations in the piezoelectric actuators used in AFMs.

Other methods of producing long microgrooves include laser scribing and diamond scribing. Laser scribing is capable of rapidly cutting long grooves in materials including stainless steel, nickel, tungsten, and silicon. Laser scribing, however, provides less control over the shape of each groove cross-section than mechanical cutting processes provide.

A high speed scribing device shuttle unit exists, which can be equipped to the Fanuc Robonano α-OiB machine, and this machine can rapidly scribe nanoscale high precision grooves using a rigid diamond tool. However, the Fanuc Robonano α-OiB machine achieves this capability via extreme rigidity of the tool and machine structure, through the use of 1 nm resolution encoders, and through the use of static air bearings on all machine axes. As a result, the Fanuc Robonano α-OiB machine is extremely expensive.

As the demands of miniaturization technology grow, it is desirable to overcome shortcomings of traditional scribing systems and methods.

SUMMARY OF THE INVENTION

A high precision micro/nanoscale machining system is provided according to embodiments of the present invention. A multi-axis movement machine provides relative movement along multiple axes between a workpiece and a tool holder. A cutting tool is disposed on a flexible cantilever held by the tool holder, the tool holder being movable to provide at least two of the axes to set the angle and distance of the cutting tool relative to the workpiece. A feedback control system uses measurement of deflection of the cantilever during cutting to maintain a desired cantilever deflection and hence a desired load on the cutting tool.

BRIEF DESCRIPTION OF THE DRAWINGS

FIG. 13 shows mounting angles for the end of an example cantilever to be parallel to a workpiece surface;

FIGS. 18A-18G with a −10 degree back rake angle.

DETAILED DESCRIPTION

Figure 1A:
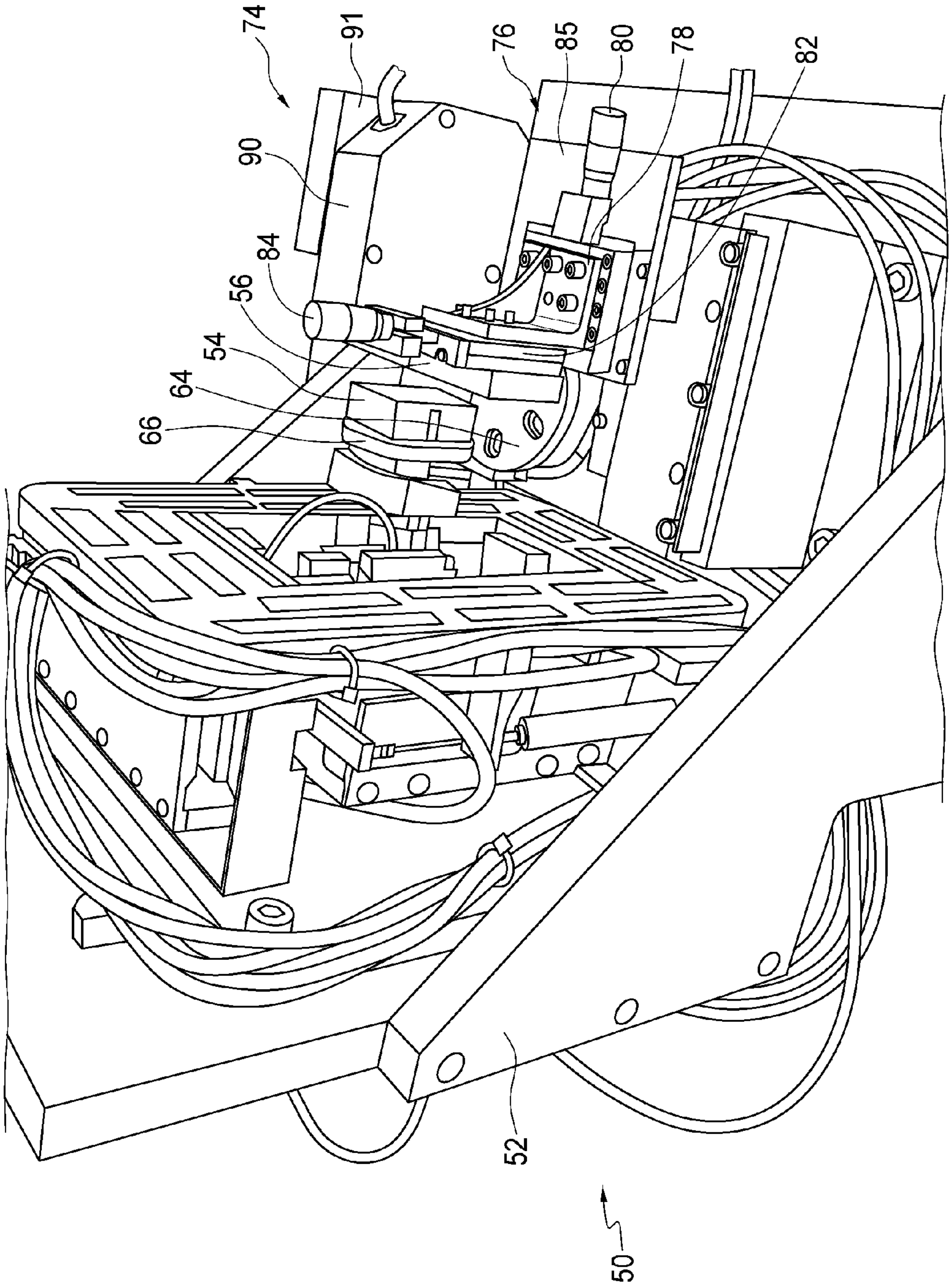
FIG. 1A is a perspective view of a micro/nanoscale machining system according to an embodiment of the present invention.

In typical mechanical scribing processes, a key goal is to achieve high rigidity, which is deemed critical to accurate positioning and cutting. Therefore, conventional tools are designed to be rigid, and any deflection is deemed undesirable. In some conventional tools, rigid micro groove cutting tools and thread cutting tools have been created using focused ion beam (FIB) machining. Such tools have been used to cut features using a turning process and system. The rigid tools are used along with an extremely stiff and high-precision machine.

Embodiments of the present invention use a different approach, employing a flexible cutting tool that eliminates the need for the machine to be extremely rigid and relaxes requirements on position sensing and position control. This provides a relatively inexpensive cutting process compared to conventional high precision processes, such as diamond scribing/diamond turning processes.

An embodiment of the invention is a high precision micro/nanoscale machining system. A multi-axis movement machine provides relative movement among multiple axes between a workpiece and a tool holder. For example, linear axes X, Y, Z and rotary axes (e.g., B and C axes) can be provided. A nonlimiting example multi-axis movement machine is a microscale machining tool (mMT).

A cutting tool is disposed on a cantilever held by the tool holder. The tool holder is movable (e.g., along two axes) to set an orientation (e.g., angle and distance) of the cutting tool relative to the workpiece. A feedback control system uses measurement of cantilever deflection during cutting to maintain a desired cantilever deflection and hence a desired load on the cutting tool. A particular example control system includes a proportional-integral-derivative (PID) control algorithm with feedforward for one or more of the axes of relative movement to control the tool holder. This system maintains the cantilever at a particular (e.g., predetermined) angle relative to, and/or a particular (e.g., predetermined) distance from, the workpiece. The resulting cantilever deflection is either constant or varied to achieve a desired cutting profile.

An example system of the invention comprises a cutting tool that includes a cutting geometry suitable for planing/shaping and is attached to or is a unitary extension of a flexible cantilever. The particular cutting geometry of the tool can be determined by the size and shape of the features to be cut. An example tool can have submicron dimensions. The tool can include separate cutting geometry and cantilever units that are joined, or it can include a single monolithic unit. Example tools can be formed from materials such as silicon, silicon coated with a harder material such as diamond, pure diamond, or any sufficiently strong and wear-resistant material. The end of the cantilever opposite the cutting geometry is joined, e.g., mechanically or using adhesive, to a tool holder.

The tool holder in an example embodiment is part of a cutting assembly, which includes the tool holder, a displacement sensor that senses bending of the cantilever and provides a signal input for the control system, and one or more micro-stages for allowing the displacement sensor output (e.g., a laser beam or strain gage output signal) and the cantilever to be aligned with one another. The cutting assembly is mounted to a motion platform with multiple axes of motion, for instance three linear axes of motion and two rotary axes of motion between the cutting tool and the workpiece. Movement of the motion platform is preferably controlled using a precision controller, such as but not limited to a CNC controller. The motion platform can be custom fabricated or may be a modified machine, such as a high-precision milling machine with its spindle replaced with the cutting assembly.

In a particular example embodiment, the cutting tool comprises an atomic force microscope (AFM) tip disposed on a flexible cantilever. The AFM tip may be, for instance, an existing AFM tip, such as a commercially available tip, or it may be a modified AFM tip. A cutting tool can be fabricated, as a nonlimiting example, by modifying AFM probes using focused ion beam (FIB) machining. The cutting tool can also be fabricated in other ways. A nonlimiting example modified AFM tip is shaped to have a predetermined cutting geometry that provides a back rake face and an end clearance face. The intersection of the back rake face and end clearance face in an example tip provides a cutting edge that maintains contact with a workpiece when the cantilever is deflected due to loading of the cutting tool against a workpiece. In some example modifications, the modified cutting tool would not be suitable for use in an AFM, but it performs well for machining according to example methods.

Nonlimiting example embodiment systems with AFM tips and flexible tools provide an AFM-based micro-scribing or cutting assembly for a machining system. Particular resolutions and displacements in an example AFM tip-based system are a function of the properties of the movement platform (e.g., mMT) that is used. Such a system, however, is not intended to limit the invention in its broader aspects, including by resolution or displacement. An example cutting assembly fits onto a 5-axis mMT in place of a spindle. The cutting assembly permits an AFM probe or other flexible cutting tool to be mounted at varying angles relative to a workpiece, and permits the deflection of the AFM or flexible tool cantilever to be measured during workpiece-AFM or flexible tool contact with the workpiece.

A preferred machining process of the invention uses the highly flexible tool to cut a groove or a pocket of several grooves. In the process, the cutting assembly is first advanced toward a workpiece until the cutting geometry makes contact with the workpiece. The assembly is further advanced toward the workpiece until the deflection of the cantilever portion of the tool results in a desired load on the cutting geometry. The workpiece is then moved in a desired pattern while the tool is engaged, similar to a planing machine, which results in a matching pattern being cut into the workpiece. During cutting, the signal from the displacement sensor is used as an input to a feedback loop that dynamically adjusts the stage, controlling the distance between the cutting assembly and workpiece in order to maintain the desired cantilever deflection, and thus controlling the desired load on the cutting geometry. The applied load, the cutting geometry, the cutting speed, and the workpiece material determine the depth of cut. The relation between applied load, cutting geometry, cutting speed, workpiece material, and depth of cut can be determined via calibration cuts or via simulation. In other example embodiments, the angle of the cutting tool can be adjusted during cutting to maintain a desired cutting angle.

With an example system, a relatively large change in cantilever deflection is advantageously required to increase the load on the tool enough to achieve a small increase in depth of cut. Accordingly, lower precision actuators and position measurement devices can be used in an example motion platform, yet the system can still machine extremely precise features. Example systems can achieve high precision manufacturing at reduced cost compared to conventional high precision machining processes, which are dependent upon extremely rigid and expensive machines.

An example process and system of the invention achieves cutting load, cutting speed, and cutting distances that are much larger than can be achieved with a conventional AFM. Embodiments of the invention provide high-speed, high-precision micro/nanoscale machining systems that can cut grooves with depths and widths of a couple microns or less, as a nonlimiting example, and with lengths that can be greater than, as a nonlimiting example, 100 mm. The example system can also be used to machine pockets (produced from multiple grooves) with micro/nanoscale depths. Grooves cut using example systems can have arbitrary cross-sections, be cut in arbitrary patterns, and have arbitrary depths at various points in a groove. A wide variety of materials may be used. Compared to conventional AFM scribing, example systems and methods can also provide greater cutting forces and relatively larger curvilinear movements. In example embodiments in which the cutting geometry on each example cutting tool is different than the geometry on the end of an AFM tip, improved cutting performance can be provided when removing larger amounts of material than are typically removed when scribing with an AFM.

Example systems of the invention can achieve fabrication of MEMS features, yet a lengthy sequence of fabrication steps is not required to cut features such as grooves. Many other applications are also possible, as will be appreciated by those of ordinary skill in the art. Example systems allow more control of features, e.g., groove cross-section, than is possible with laser scribing. Example processes and systems of the invention also provide the ability to rotate the workpiece stage, which provides the capability of cutting smooth curvilinear grooves. Compared to some highly rigid diamond scribing machines, example embodiments provide relatively inexpensive systems and methods that employ highly flexible tools, tools with specialized cutting geometries, lower resolution encoders, and more conventional mechanical bearings. As a result, an example system can use much (e.g., by a factor of ten or more) less expensive hardware to accomplish suitable results.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Figure 1B:
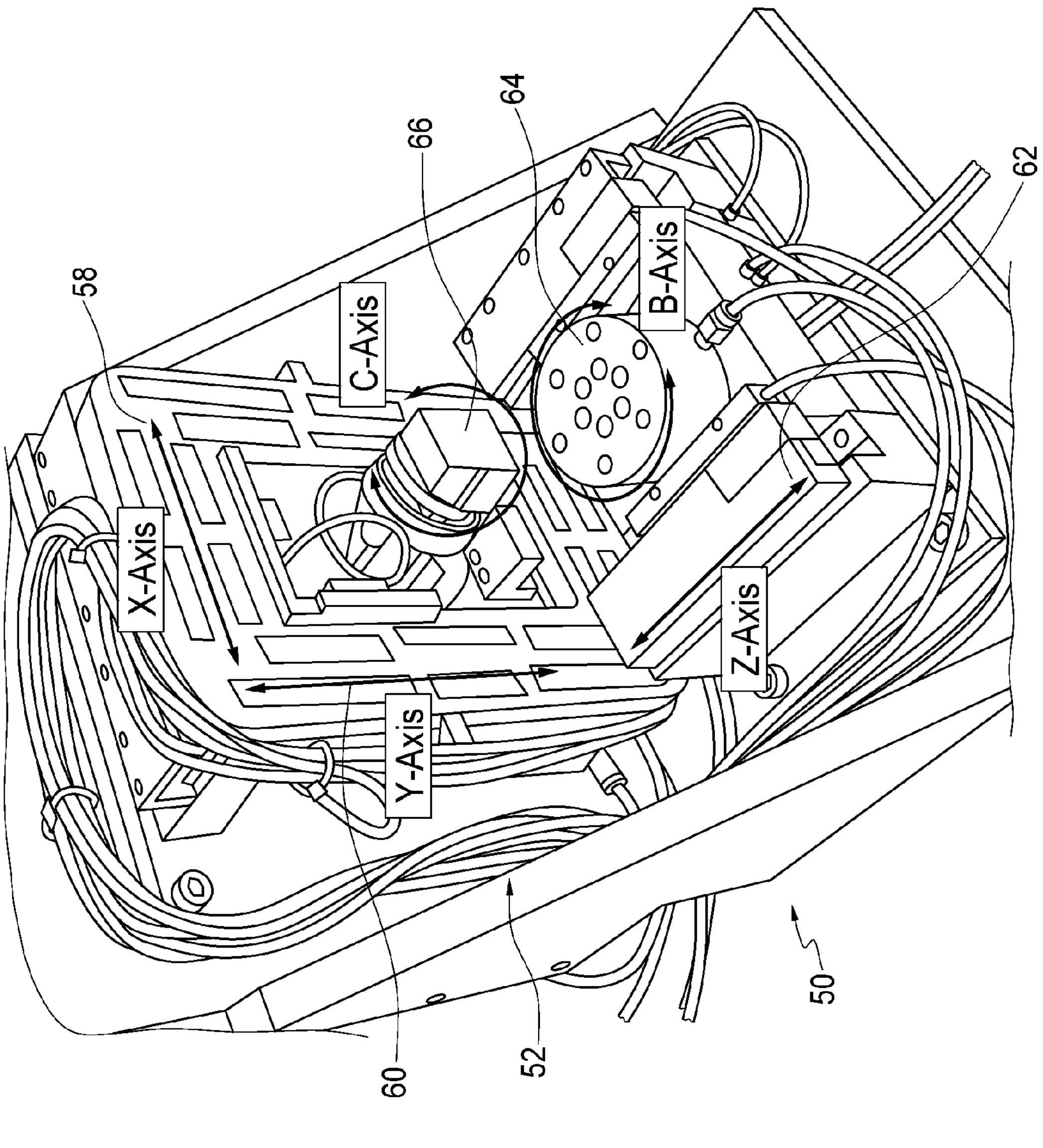
FIG. 1B is a perspective view of a 5-axis movement machine without a cutting assembly.
Figure 1C:
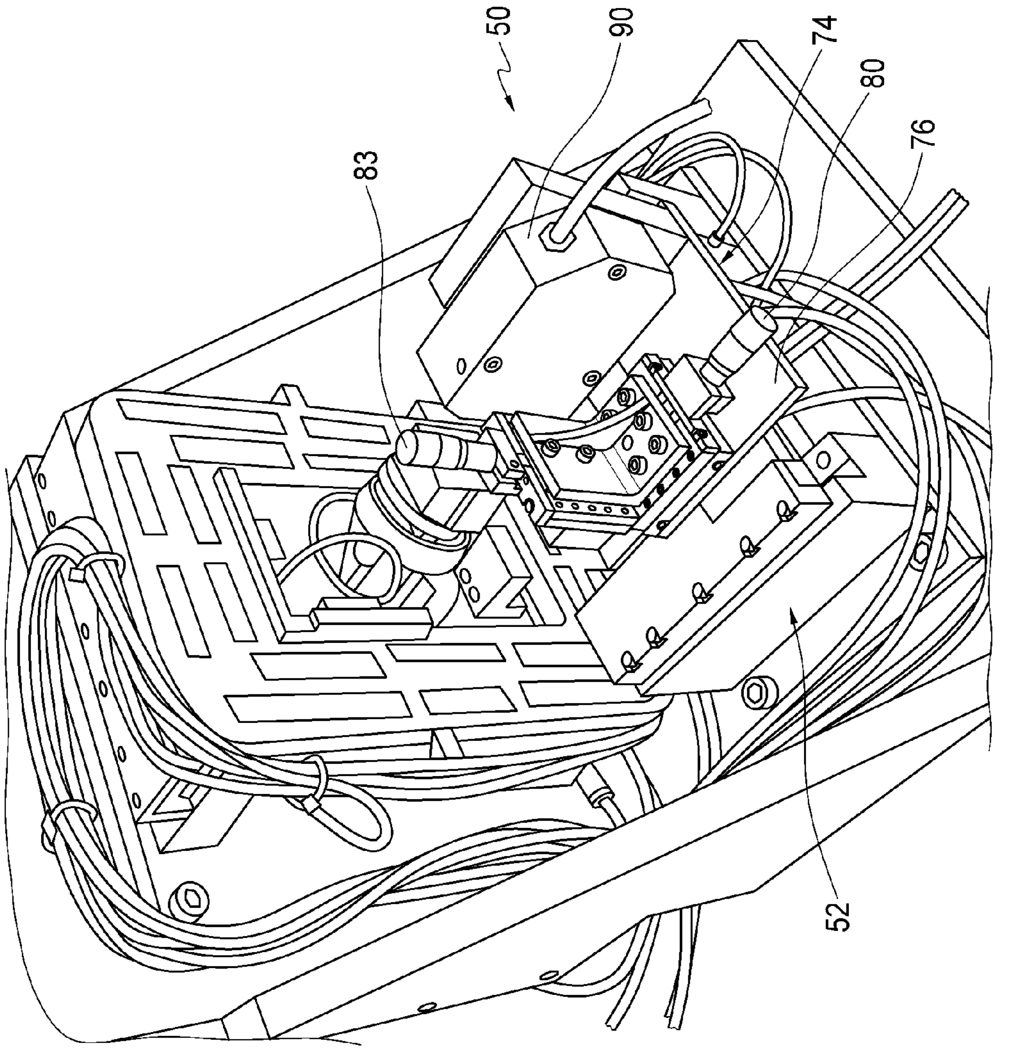
FIG. 1C is a perspective view of the 5-axis movement machine of FIGS. 1A-1B with the cutting assembly attached thereto.

FIGS. 1A-1C show an example micro-scale machining system 50. The system 50 generally includes a multi-axis movement machine 52 or movement platform (best shown in FIG. 1C) providing relative movement between a workpiece 54 and a tool holder 56 (see FIGS. 2-3). The multi-axis movement machine 52 can be, as a nonlimiting example, a 5-axis microscale machining tool (mMT). An example 5-axis mMT which can be used is disclosed in Phillip, A. G. Kapoor, S. G., and DeVor, R. E., "A New Acceleration-Based Methodology for Micro/Meso-Scale Machine Tool Performance Evaluation," International Journal of Machine Tools & Manufacture, vol. 46, 2006, pp. 1435-1444, which is incorporated in its entirety herein by reference. Other multi-axis movement machines, such as the general-purpose 5-axis motion platforms sold by companies such as Aerotech, Inc., can be used. Alternatively or additionally, the multi-axis movement machine 52 can be customized.

Figure 2A:
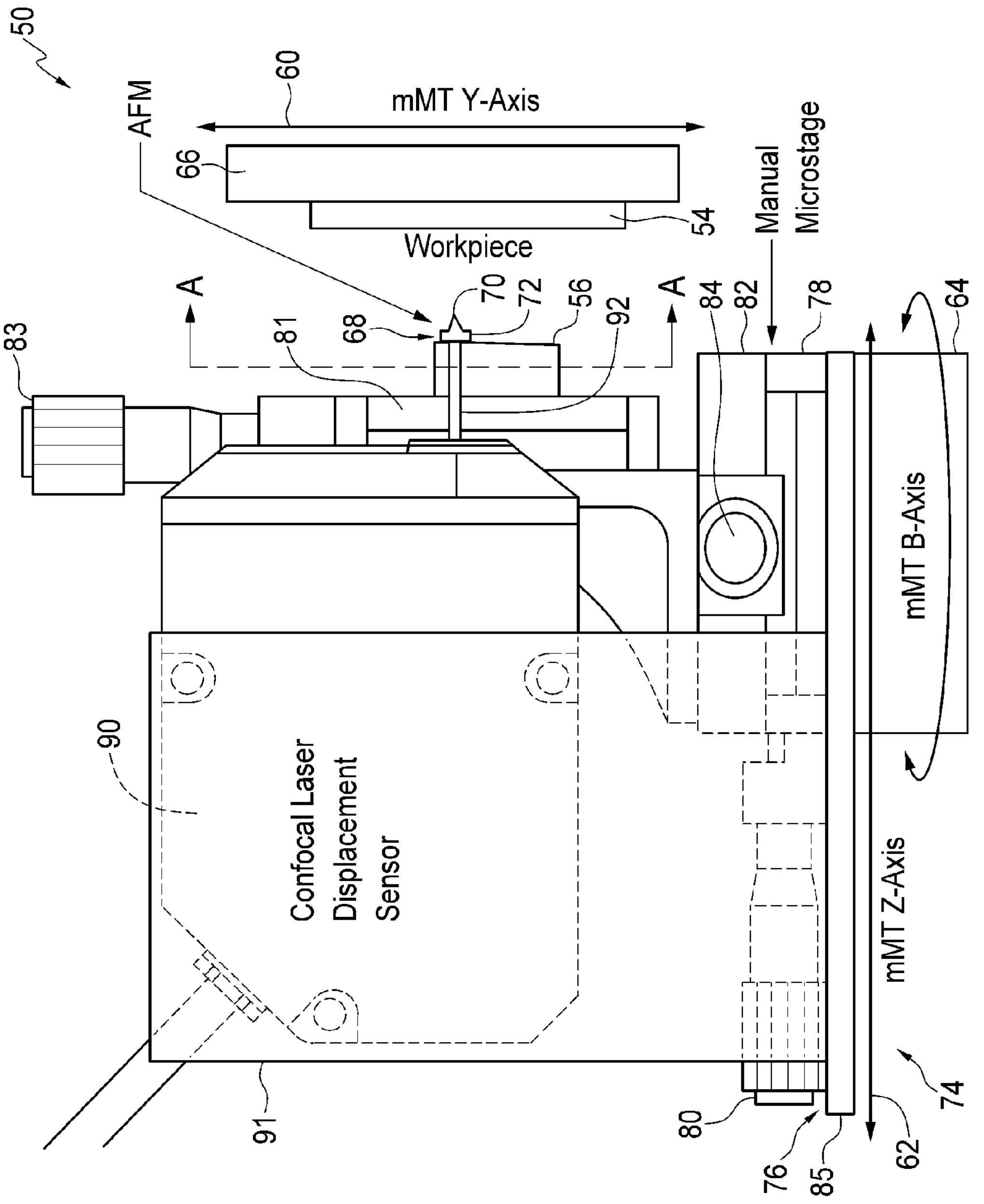
FIG. 2A is a side elevation view of a cutting assembly for the micro/nanoscale machining system of FIG. 1.
Figure 2B:
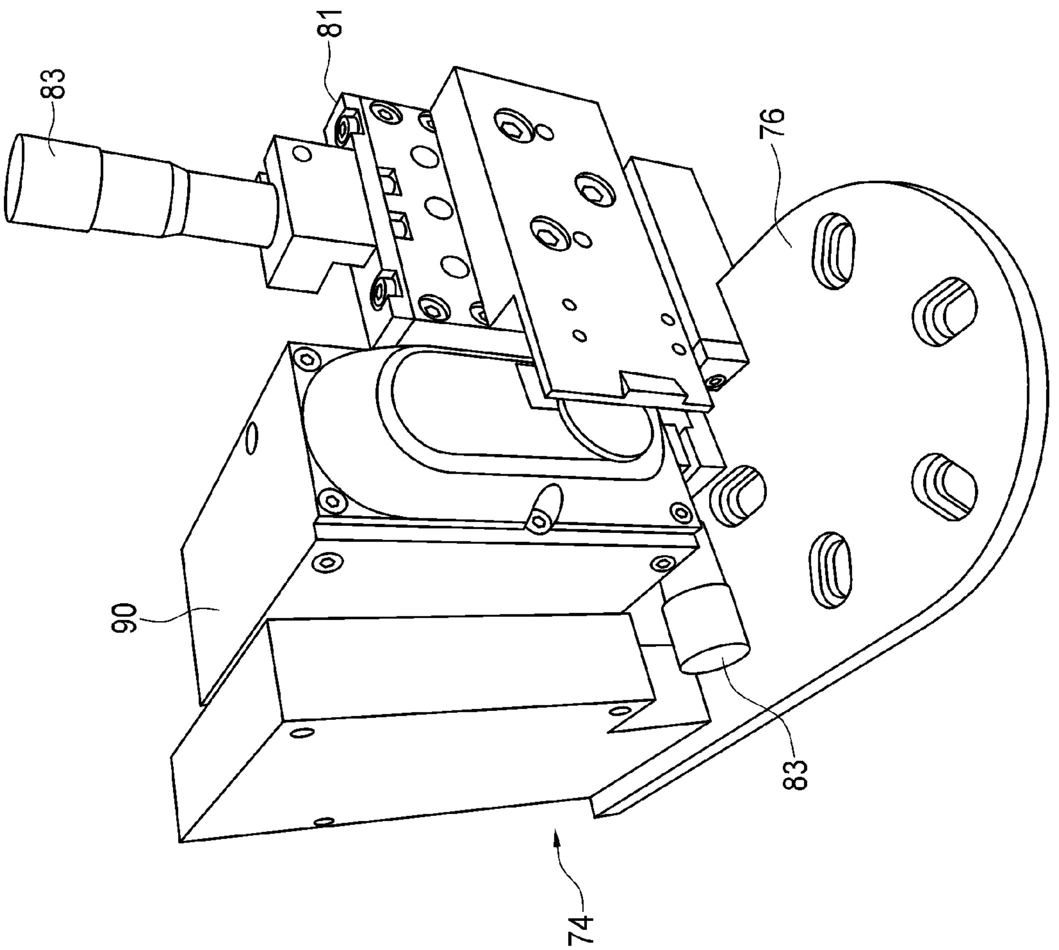
FIG. 2B is a rear perspective view.
Figure 2C:
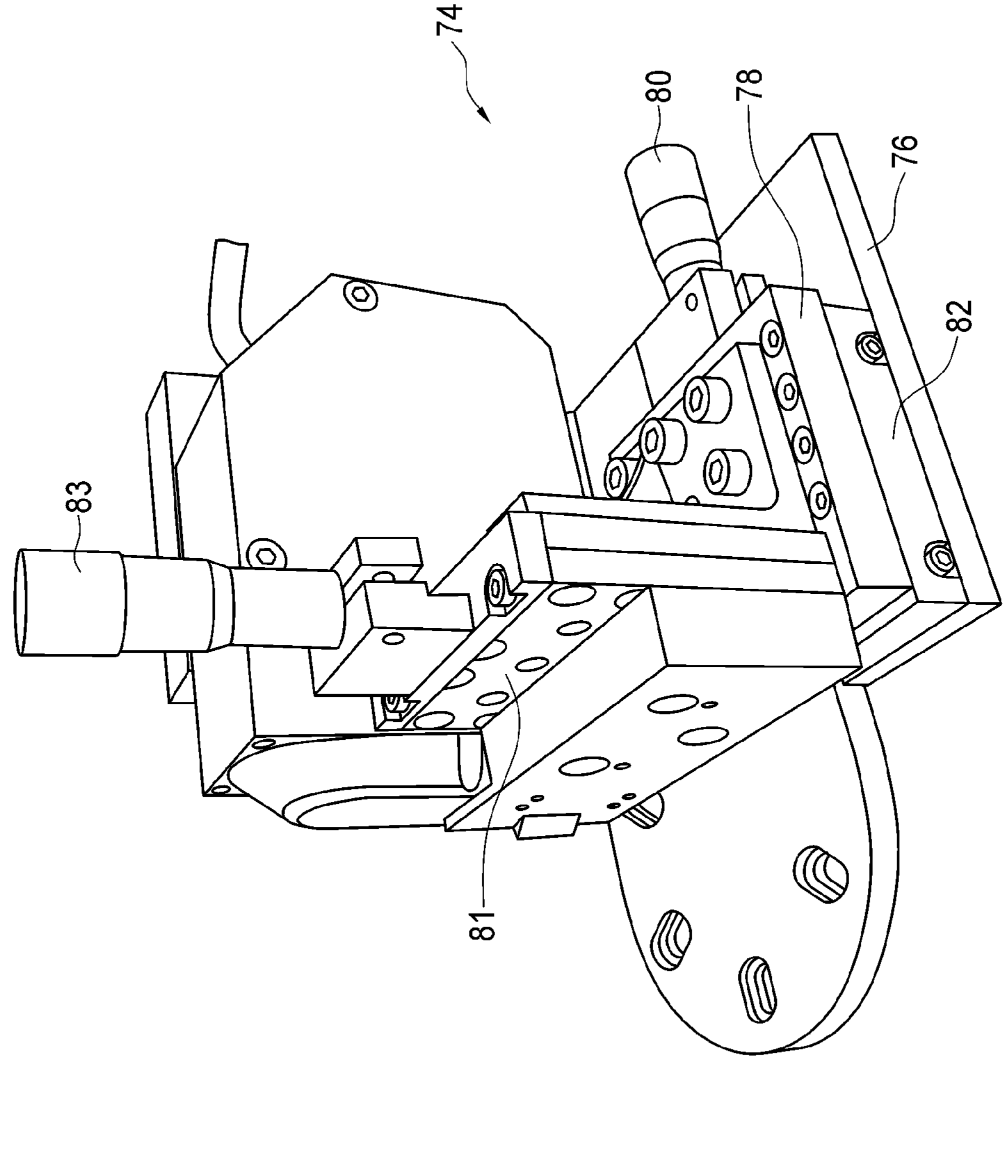
FIG. 2C is a side perspective view.
Figure 2D:
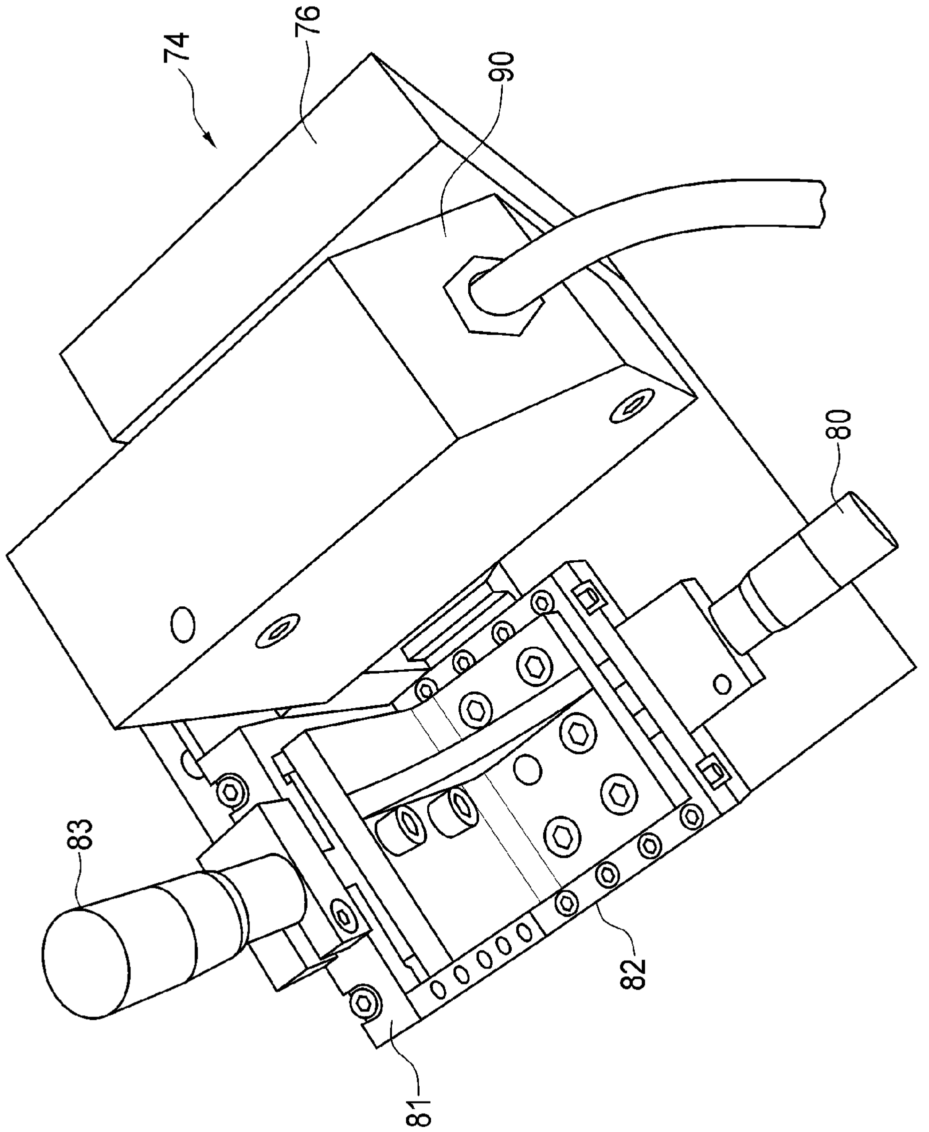
FIG. 2D is a top perspective view.
Figure 2E:
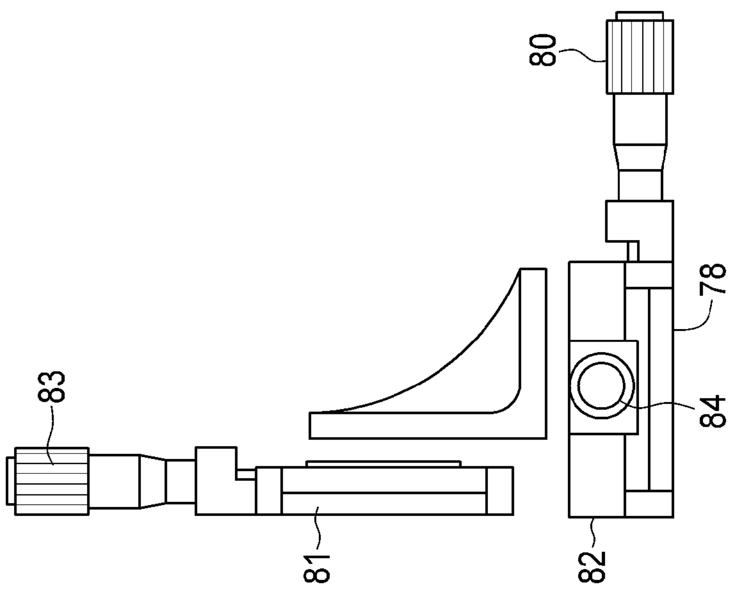
FIG. 2E is a side elevation view of microstages for the cutting assembly.
Figure 2F:
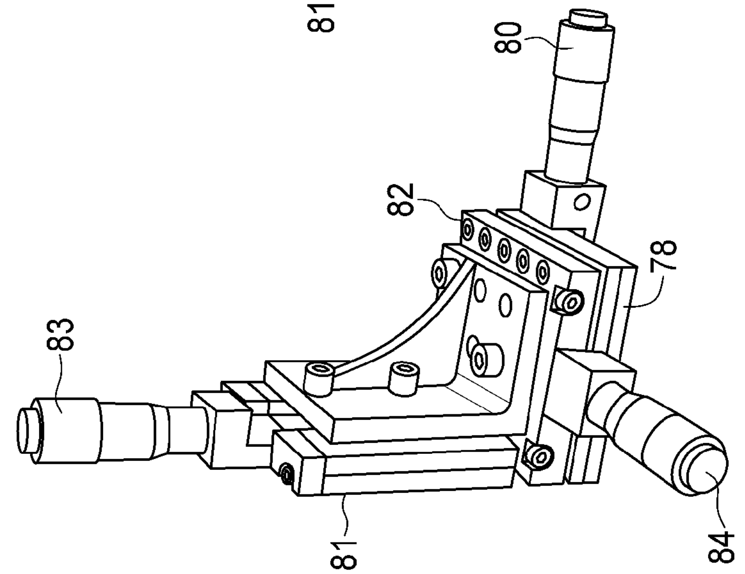
FIG. 2F is a side perspective view of the microstages.
Figure 2G:
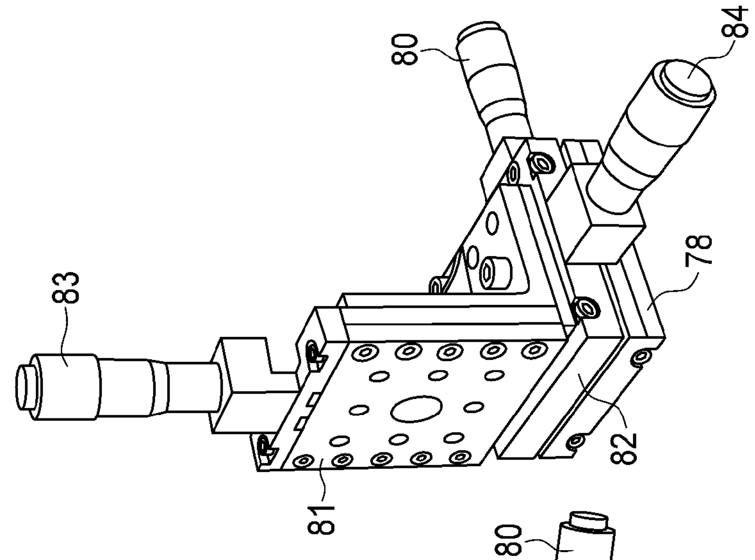
FIG. 2G is a rear perspective view of the microstages.
Figure 3A:
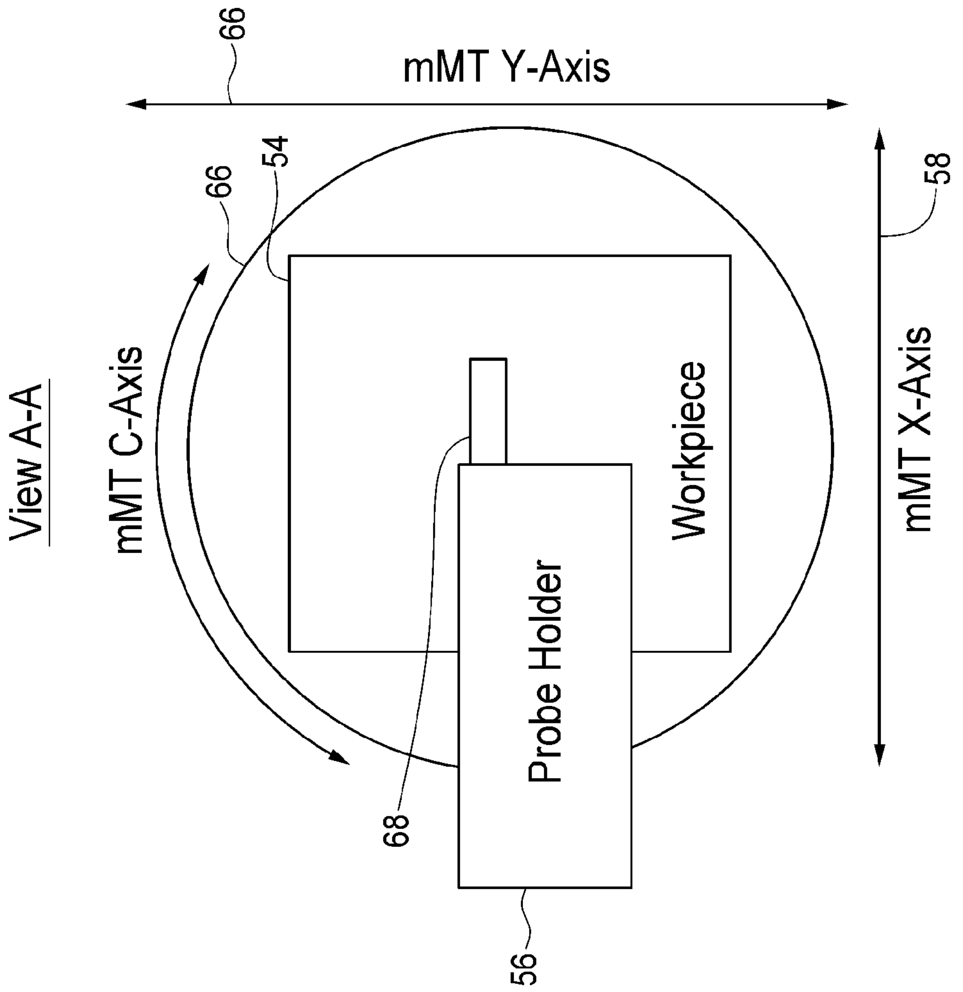
FIG. 3A is a front plan view of a portion of the cutting assembly taken along A-A in FIG. 1 and in the direction indicated.
Figure 3B:
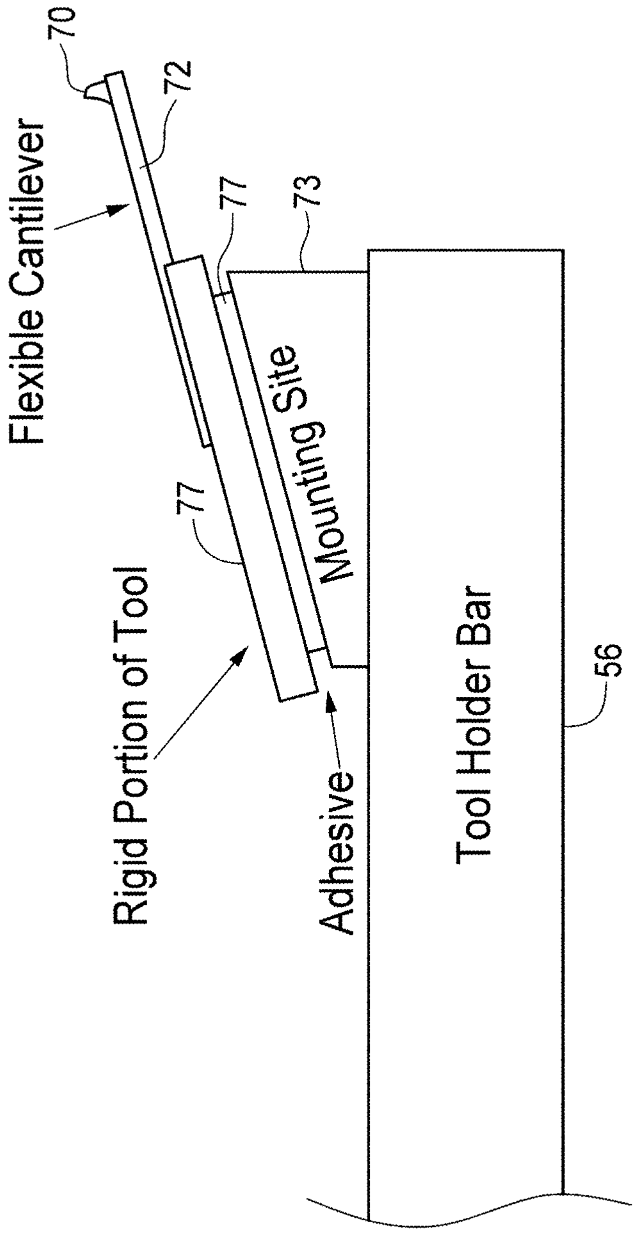
FIG. 3B is a side elevation view of an attachment between a tool holder bar and a cutting tool.
Figure 4A:
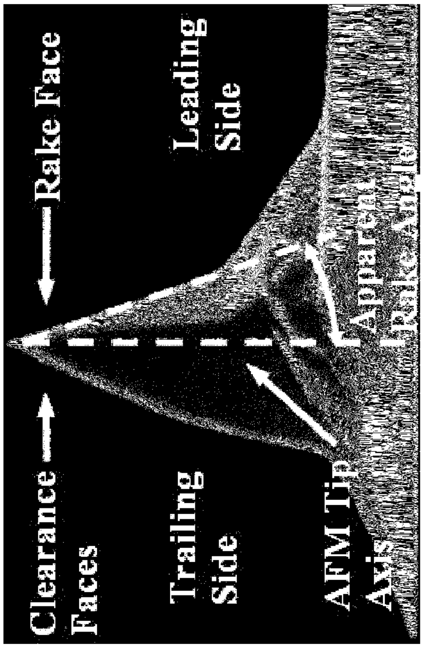
FIGS. 4A-4D are photographs of an example cutting tool formed by an atomic force microscope (AFM) probe having a diamond coated tip.
Figure 4B:
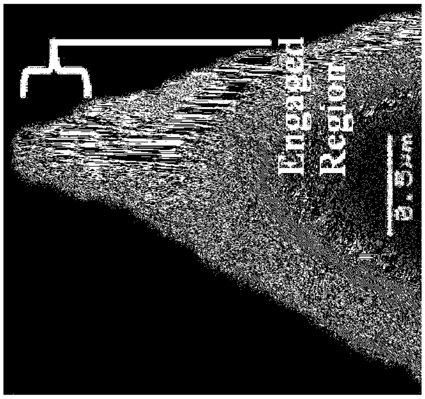
Figure 4C:
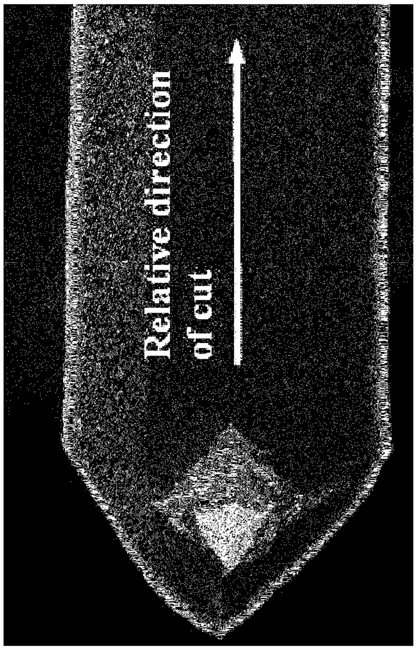
Figure 4D:
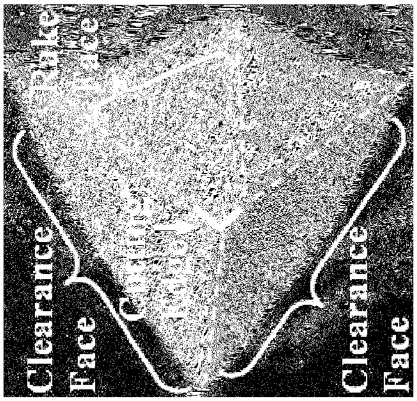

As best shown in FIGS. 1B, 2A, and 3A, the example multi-axis movement machine 52 provides movement along linear axes X, Y, and Z via an X-axis movement stage 58, a Y-axis movement stage 60, and a Z-axis movement stage 62, respectively, and rotary axes B and C via a B-axis rotary stage 64 and a C-axis rotary stage 66, respectively, to control relative movement between the workpiece 54 and the tool holder 56. As used herein, the X, Y, Z, B, and C axes will refer to the directions shown in FIGS. 2-3 and as marked in FIG. 1B. It will be understood that other directions/axes of movement are possible. Nonlimiting example linear axes are capable of displacements of several centimeters, at speeds of at least 25-50 millimeters per minute. In a nonlimiting example embodiment, travel for each of the linear X, Y, and Z stages 58, 60, 62 of the example mMT 52 is 35 mm. The example B stage 64 allows the tool holder 56 to rotate up to 180 degrees, and the C stage 66 allows the workpiece to be rotated 360 degrees. Actuation of the axes can be accomplished using linear and rotary motors, voice coil actuators, or lead screw actuators, as nonlimiting examples.

Measurement of axis position is accomplished in example embodiments using linear and rotary encoders equipped for each stage. Magnetic encoders or optical encoders may be used, for example. Other example precision methods for measuring linear and rotary axis positions include high accuracy distance measuring sensors such as LVDT, laser interferometer, or reflection-based laser displacement sensor. An example linear encoder is a 20 nm resolution linear optical encoder. Example encoders for the two rotary stages 64, 66 include 0.316 arcsec resolution encoders.

A controller, such as a computed numerically controlled (CNC) controller, and in a more particular nonlimiting example, a Delta Tau Turbo UMAC CNC controller, is provided to control movement of the example movement machine 52, including relative movement of the tool holder 56 and the workpiece 54. The example controller has a built-in implementation of proportional-integral-derivative (PID) control with feedforward for each of the axes of the mMT and has built-in implementation of standard CNC move commands.

For machining the workpiece 56, a cutting tool 68 is mounted to the tool holder 56. The cutting tool 68 generally includes a cutting tip (tip) 70 disposed at or near the end of a flexible cantilever 72 for contacting the workpiece 56 during machining. As a nonlimiting example, the cantilever 72 can have a flexibility of about 42 N/m, the stiffness of commercial silicon AFM probes. The upper bound on stiffness, though, could be, say, several thousand N/m. As used herein, "at the end" of the cantilever is intended to also refer to at or near the end of the cantilever. The cutting tool 68 can be mounted to the tool holder 56 at varying angles relative to the workpiece 54.

A nonlimiting example cutting tool 68 is an atomic force microscope (AFM) probe, either unmodified or modified, e.g., custom modified for machining. Example cutting tools in preferred systems of the invention can be provided to achieve desired feature cross sections. The shape of the cutting tools can have variations comparable to those that are used in macroscale planing and shaping tools. Nonlimiting example macroscale tool shapes are found in the ASM handbook (ASM International, 2009), incorporated in its entirety herein by reference. Particular embodiment tools of the invention can be fabricated by FIB processes, particular examples of which are described below.

Compared to known macroscale tools, cutting tools used in example systems are highly flexible. Also, FIB manufacture to produce an example tool provides geometries at a much smaller scale. FIB machining has previously been used to modify AFM tips, but into shapes suitable for metrology, not for cutting. The tip geometries of some commercial probes are optimized for metrology purposes, and may neither be structurally strong enough nor properly shaped to be good cutting tools. The FIB machining process is used in particular example fabrication methods of the invention to produce tools having predetermined cutting geometries.

In an alternative embodiment, the cutting tool can be a cantilever with a piece of single-crystal diamond with a prescribed cutting geometry attached to one end. A nonlimiting example includes a single-crystal diamond AFM tip bonded to a sapphire cantilever with a metallic adhesive. This cantilever can in turn be bonded to a substrate, e.g., a sapphire substrate, mounted to the tool holder 56. Such tools can be fabricated by modifying diamond AFM probes (e.g., those manufactured by Micro Star Technologies) via FIB machining. Examples of such probes can have a rectangular rake face, an end clearance face, and two side clearance faces, though other rake face shapes can be provided.

In an example embodiment, the tool holder 56 is part of a cutting assembly 74, shown in FIGS. 2A-2D, which in an example embodiment is configured (in any suitable manner, such as but not limited to bolting, clamping, or otherwise mounting) to fit to the Z axis stage 62 and/or the B axis rotary stage 64 of the multi-axis movement machine 52, e.g., in place of a spindle assembly (FIG. 1C). In this way, the movement machine 52 provides a motion platform for the cutting assembly 74. In an example embodiment, as best viewed in FIG. 3B, a portion of the tool holder 56, e.g., a bar, includes a mounting site 73 for attaching a rigid tool portion 77, such as by an adhesive 77. The flexible cantilever 72 is a unitary piece with, integrated with, connected, fixedly coupled (e.g. mounted), or otherwise combined or incorporated with the rigid tool portion 77 so that the flexible cantilever projects from the tool holder 56.

The example cutting assembly 74, which supports the tool holder 56, includes a frame 76 on which is coupled (e.g., mounted) a first microstage 78, positioned by actuator 80, a second microstage 82, positioned by actuator 84, and a third microstage 81, positioned by actuator 83. FIGS. 2E-2G show examples of the microstages 78, 82, 81. The microstages 78, 82, 81 as a nonlimiting example can be manual microstages, such as but not limited to stages driven by screw-driven actuators, e.g., using manually actuated lead screws. In the example cutting assembly 74, the first microstage 78 is adjustably coupled to a bottom surface 85 of the frame 76 for selectable movement along the Z-axis, the second microstage 82 sits directly on top of and is adjustably coupled to the first microstage for selectably moving the tool holder 56 along the X-axis, and the third microstage 81 is attached to the second microstage, e.g., via an angle bracket, and can adjust position along the Y-axis.

Generally, in an example microscale machining (e.g., scribing) process, the tool tip 70 is brought into contact with the workpiece 54, and the workpiece is moved relative to the tip in a direction coincident with the axis of the flexible cantilever 72. Moving the workpiece 54 along this direction helps to prevent twisting or buckling of the cantilever 72. However, it is also contemplated that the tool 68 and/or workpiece 54 could be moved relative to one another along other directions or via other methods. The example process is generally analogous to microscale planing, in that material is removed from a workpiece in the form of chips by moving the workpiece 54 along a set path at a set velocity underneath the tip 70, but it differs, among other ways, in that the radius of the tool tip 70 can be of the same order of magnitude as an uncut chip thickness and the tip is mounted on a highly flexible cantilever 72. This does not limit the types of geometries that can be generated, because the workpiece rotary stage (C axis stage 66) can be used to achieve curvilinear scribe geometries without violating this constraint.

The flexibility of the example cantilever 72 inhibits direct control of cut depth using the controller. Particularly, the high flexibility of the cantilever 72 renders it difficult to force the tip 70 to move relative to the workpiece 54 at a set depth. Instead, the depth of cut and effective rake angle of the tool 68 change as the cantilever 72 deflects under applied load and cutting forces. However, in an example system and method, depth of cut is dependent on tool geometry, cutting speed, probe mounting angle, and tool (cutting) load, all of which can be controlled. Thus, according to embodiments of the present invention, the tool load is controlled by measuring cantilever deflection and using the result as feedback to maintain a deflection corresponding to a desired load. In this way, example systems and methods rely on controlled deflecting during cutting. An advantage of this method is that the cantilever deflection required to develop a load that results in a very small depth of cut (e.g., less than 100 nm) is on the order of microns. Hence, stage movements do not need to be nearly as precise as with a rigid tool. Therefore, a less expensive machine with less rigid stages and lower cost encoders can be used.

According to embodiments of the present invention, deflections of the cantilever 72 are measured during workpiece-tip contact. This measurement in example embodiments is provided by a precision displacement sensor 90, which is part of the cutting assembly 74. The displacement sensor 90 can be, for instance, fixedly coupled (e.g., mounted) to a side surface 91 of the frame 76. In an example embodiment, the displacement sensor 90 is a laser displacement sensor and in a more particular embodiment is a confocal laser displacement sensor, such as but not limited to a Keyence LT-9010M confocal laser displacement sensor. Other types of displacement sensors are also contemplated, such as but not limited to a strain gage or other displacement sensor integrated into a cutting tool cantilever.

The example displacement sensor 90 supplies an output beam 92 to measure the deflection of the cantilever 72 during cutting. A nonlimiting example displacement sensor 90 can measure distance from itself with a resolution of 10 nm while continuously focusing on a single spot on the cantilever 72 (displacement mode) or while continuously sweeping back and forth across the cantilever (scanning mode). The former option allows displacement of a single point to be measured at a rate (for example) of 1562 Hz, while the latter option allows the bent shape of the cantilever to be measured at a rate of (for example) 27 Hz via 13 points located at 10 μm lateral increments. The first microstage 78 and the second microstage 84 permit alignment of the cantilever 72 with the output (e.g., laser) beam 92 of the displacement sensor 90 by providing selective adjustment of the tool holder 56.

The exact relationship between tool 68 load and depth of cut can be established via empirical testing and used to pick a set of conditions that will result in a desired depth of cut. The relationship between applied load and cantilever deflection can be established analytically using a cantilever beam model of the tool. In a particular example method, the deflection measurement from the displacement sensor 90 is used as input to a feedback loop that maintains a set load normal to the workpiece 54 during scribing and is used for contact detection during workpiece registration. The flexibility of the tools used in example systems 50 with controlled deflection based on feedback allows very small depths of cut to be possible using relatively inexpensive equipment.

Accordingly, in an example operating method for operating the cutting tool 68, workpiece registration is accomplished by contacting three points on the workpiece 54 with the tip that are not collinear and then fitting the coordinates of those points to a plane. Contact detection is accomplished by moving the workpiece 54 via X and Y stages 58, 60 to an X-Y coordinate of interest and then advancing the cutting assembly 68 towards the workpiece using the Z axis stage 62 while monitoring the laser displacement sensor output (beam 92). When the laser sensor output 92 indicates a change in cantilever 72 position of a prescribed amount (examples of which will be apparent to an artisan), the contact Z-coordinate is taken to be the Z-encoder output offset by that amount.

To control the load applied to the tool tip 70 (e.g., AFM tip), the displacement value output (beam 92) from the displacement sensor 90 is related to the load on the tool tip. The relationship between tip displacement and nominal load is dependent on the cantilever geometry and can be readily calculated. In an example embodiment, for each cutting tool 68, the relationship between the nominal load and tip 70 displacement normal to the workpiece 54 surface is first established using a model, such as but not limited to a 2D finite element model (FEM) of the cutting tool. In an example FEM, the nominal load is defined as the load normal to the workpiece 54 surface that would result in a given cantilever 72 deflection if the forces on the tip 70 in the direction of cut are zero. A cantilever beam model of the tool can also be used to establish the relationship between the load and the cantilever deflection. In an example method, an assumption is made of no forces in the direction of cut for simplicity. This assumption should be valid because such forces would have to act through a very short moment arm to affect cantilever deflection, and thus such an effect is not likely to be large. Plane stress with specified thickness is also assumed for all elements in the model, and the mean width of each cantilever 72 is used as the element thickness.

The relationship between the displacement sensor output 92 and the tip 70 displacement is then established via simulation and/or calibration. In an example method, calibration involves moving the tip 70 into contact with an artifact, e.g., a flat silicon artifact, and then continuing to slowly move the cutting assembly 74 towards the artifact up to a set distance. The relationship between the sensor output 92 and the known additional distance moved by the cutting assembly 74, which approximates the actual deflection, provides an example calibration curve. Using this curve and the results of the finite element analysis, the relationship between nominal load and displacement sensor output (e.g., laser output 92) is established.

During an example scribing method, the controller (e.g., the CNC controller with PID feedforward control) executes a planned XYC-stage trajectory, while a corresponding tip 70 nominal load trajectory is followed. Achieving a set nominal load involves, for example, continuously measuring the displacement of a point on the back of the cantilever 72 and then relating the measurement to the tip 70 displacement via the provided calibration curve. The difference between the measured tip 70 displacement and the displacement that would achieve a desired nominal load is used as an input to a control algorithm, which can be fairly simple. The output from the control algorithm is used to control the Z stage 62 of the movement machine 52 to control load on the cutting tool 68.

As stated above, the cutting tool 68 can comprise a probe of an AFM, including a commercial AFM probe or a modified AFM probe. FIGS. 4A-4D show an example cutting tool geometry in which the cutting tool is embodied in a NanoWorld Probepoint® DT-NCHR AFM probe. Each AFM probe includes a monolithic silicon cantilever and an AFM tip, with a nominal stiffness of 42 N/m, coated with a 100-200 nm thick layer of polycrystalline diamond. These example probes have a three-sided pyramidal cutting geometry near the apex of the AFM tip, and there are two clearance faces on the trailing side of the tip. There are also two faces on the leading side of the tip, but they are oriented such that only one face, the rake face, meets with the two clearance faces to form the cutting edges. Both the cutting edges and the tip apex for the example AFM probe have radii of 100-200 nm due to the conformal diamond coating.

The example AFM tip has a constant apparent rake angle similar to a conventional cutting tool. However, the effective rake angle, the angle of the effective rake face relative to the direction of cut, is affected by more than just the AFM tip geometry. Particularly, the effective rake angle is dependent upon both tip geometry and the orientation of the tip during cutting.

Figure 5A:
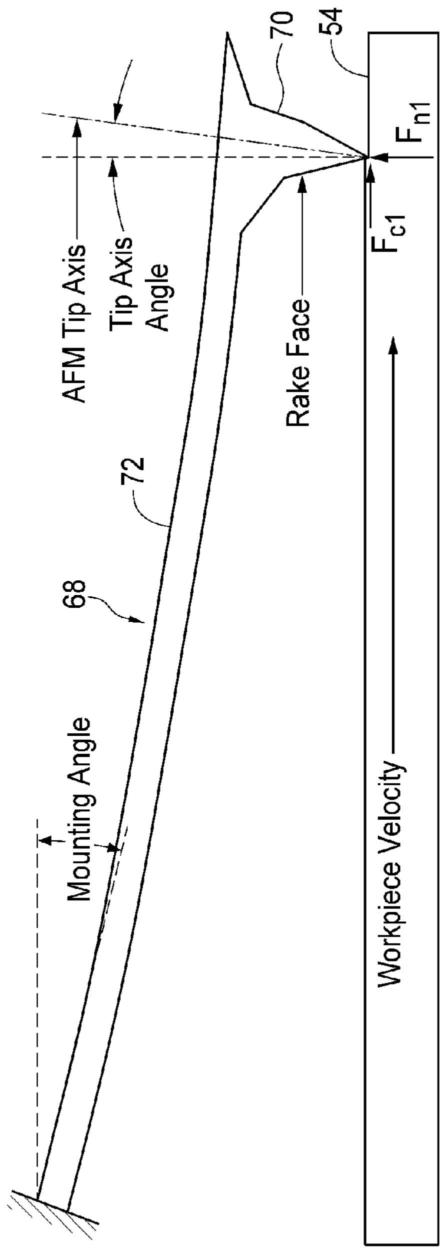
FIGS. 5A-5C show effects of mounting angle and cantilever bending effect at low (FIG. 5A) and high (FIG. 5B) applied loads for an example cutting tool, where FIG. 5C additionally shows a change in rake angle and cutting edge displacement that occurs with applied load.
Figure 5B:
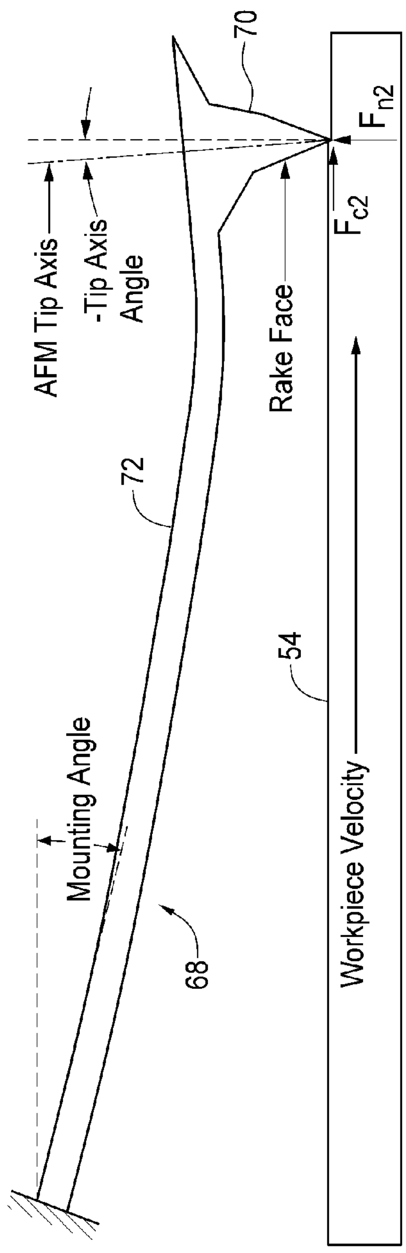
Figure 5C:
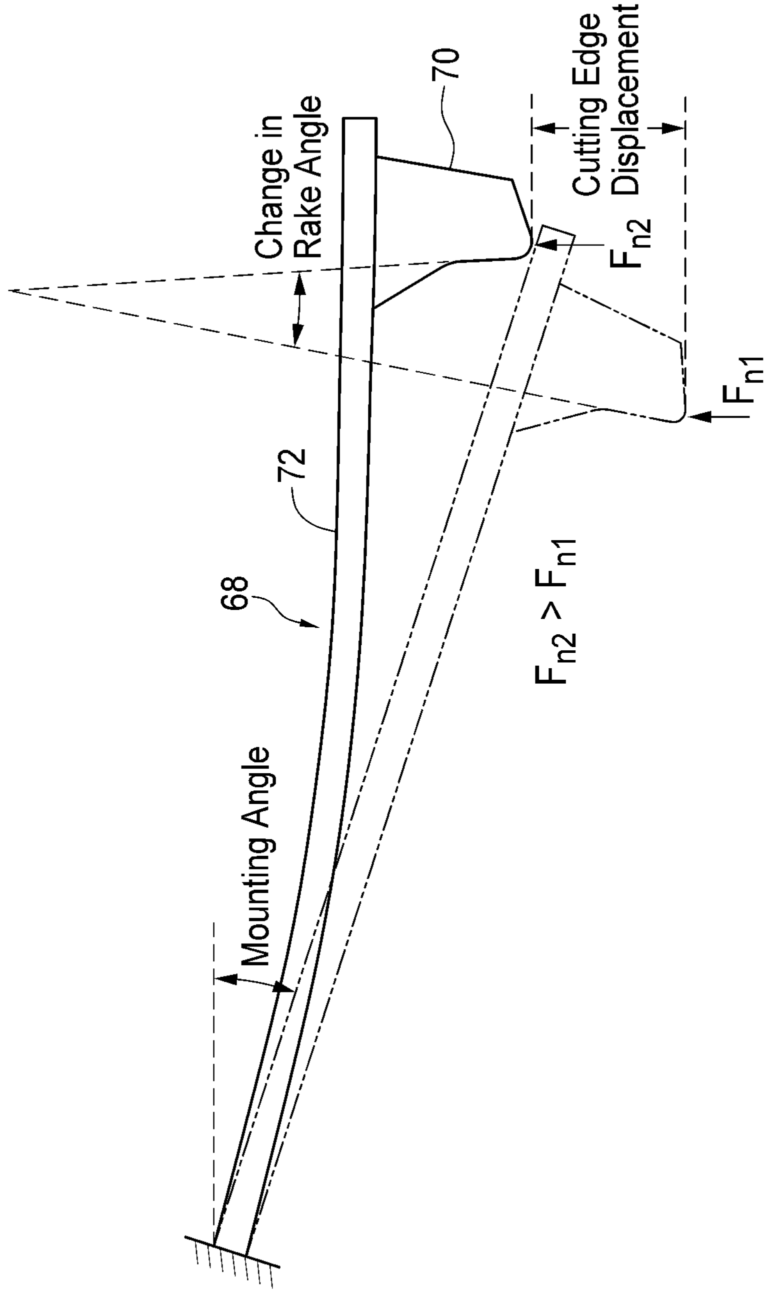

The orientation of the axis of the tip is controlled by the unbent orientation of the AFM cantilever, which can be set via the mounting angle, the applied load normal to the workpiece $F_n$, and the total forces generated in the direction of cut (cutting force) $F_c$, as shown in FIGS. 5A-5C. Hence, if all other factors, such as depth of cut and tool wear, were held constant, a greater mounting angle would result in a more positive effective rake angle. Similarly, a greater applied load and/or greater cutting forces would result in a more negative effective rake angle. For instance, FIG. 5A shows the orientation of the rake face when the applied load $F_{n1}$ and cutting forces $F_{c1}$ are low, while FIG. 5B shows the orientation of the rake face when the applied load $F_{n2}$ and cutting forces $F_{c2}$ are high. FIG. 5C shows a change in rake angle and cutting edge displacement that occurs with applied load.

The micro-geometry of the example AFM tip also affects the effective rake angle. The cutting edges of an AFM tip have radii $r_e$ that are close to, and often more than, the uncut chip thickness $t_c$. As a result, the effective rake angle is more negative than the rake angle would be based on rake face orientation alone. Hence, the effective rake angle is determined by both the rake face orientation relative to the direction of cut and the edge radii of the tip relative to the uncut chip thickness. In previous simulations of microscale cutting, where the uncut chip thickness is less than the edge radius of the tool, the effective rake angle has been estimated by extending a line between the lowest point on the cutting edge and a point on the rake face with an elevation that is 1.5 times the uncut chip thickness. Hence, the effective rake angle is determined by both the rake face orientation relative to the direction of cut and the edge radii of the tool.

Additionally, the combination of micro-geometry and uncut chip thickness determines if a chip is formed during scribing or if workpiece material is only ploughed. Chip formation will not occur if the uncut chip thickness is less than the minimum chip thickness $t_{cmin}$, which is a material dependent fraction $\lambda_n$ of the cutting edge radius for many workpiece materials.

Using example methods using the AFM probe shown in FIG. 4 as the cutting tool 68, workpieces were machined including a 1.6 μm thick thermally evaporated aluminum film deposited on a polished silicon substrate and a 1.2 μm thick aluminum film thermally evaporated onto a 10 nm thick chromium adhesion layer that was thermally evaporated onto a polished silicon substrate. For both workpieces the depth of cut was less than 25% of the film thickness, and the film Ra was less than 5 nm, as measured with an optical profilometer. During cuts, the nominal load on the AFM tip was ramped up from zero to the desired load while cutting was in progress, i.e., while the workpiece was moving and in contact with the AFM tip, and then maintained at the desired load for the rest of the cut. This was done to minimize tip breakage due to sudden loading. After generating a calibration curve and registering the workpiece according to the example methods described herein, grooves were cut under various conditions, and the worn AFM tip was examined with a scanning electron microscope (SEM) to determine the amount of tool wear and to examine chips stuck to each tip. Parameters describing groove geometry, such as groove depth, groove width, groove skewness, groove kurtosis, and unfolded burr height were considered.

For employing long, multiple tool pass cuts using the example AFM probe, a low mounting angle (e.g., a more negative effective rake angle), high cutting speed, and a moderate load result in low wear over long scribing lengths. Lowering the cutting speed to be comparable to the speeds used when cutting inside an actual AFM (typically no greater than 1.2 mm/min) may not be beneficial. More positive effective rake angles (larger mounting angles) can give rise to high levels of tool wear and fracture.

While the depth of cut increases the most during the first couple of tool passes, the amount of material removed generally increases during all tool passes, and multiple tool passes result in a more uniform depth of cut over the course of the groove. A change in geometry (e.g., from a sharp tool to a duller tool) also affects the amount of material removed per pass and the groove shape. Formation of very short chips can result in large amounts of particle generation, which can be difficult to remove from the workpiece surface. However, short chips have the advantage of preventing chip snarling.

Figure 6C:
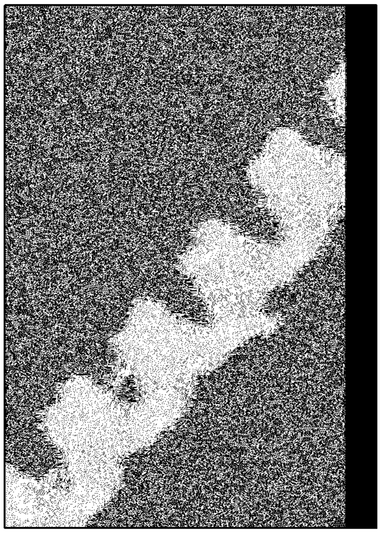
FIGS. 6A-6C show ribbon, washer-type helical, and tubular chips, respectively.
Figure 6B:
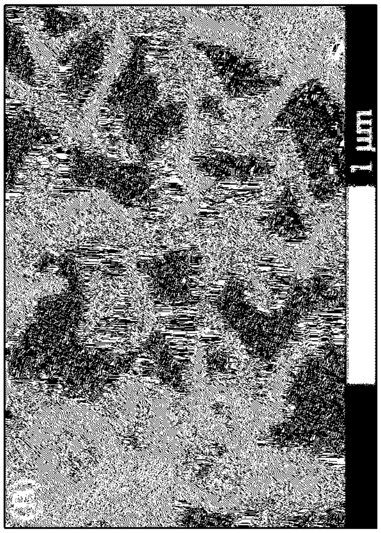
Figure 6A:
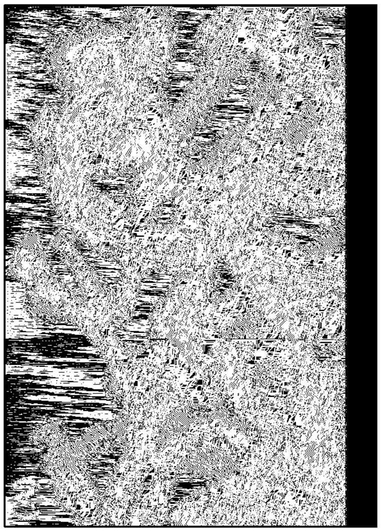
Figure 7A:
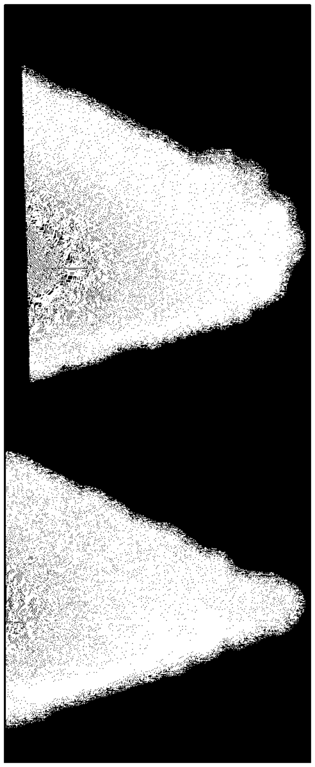
FIGS. 7A-7D show new (left) and worn (right) AFM tips in cutting orientation with rake faces on the left side, for 25 mm/min, 5 degrees, 0.5 mN (FIG. 7A), 25 mm/min, 30 degrees, 0.5 mN (FIG. 7B), 15 mm/min, 5 degrees, 0.25 mN (FIG. 7C), and 15 mm/min, 30 degrees, 0.25 mN (FIG. 7D)
Figure 7B:
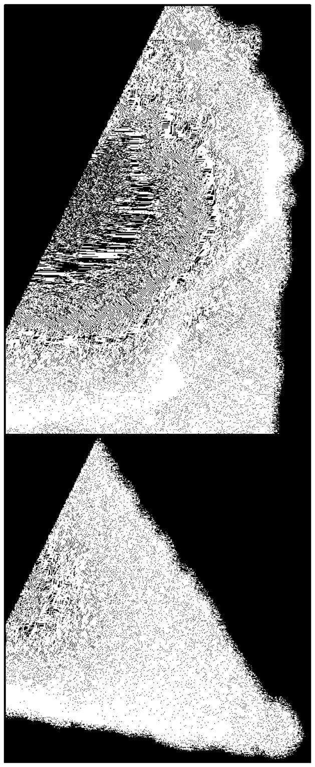
Figure 7C:
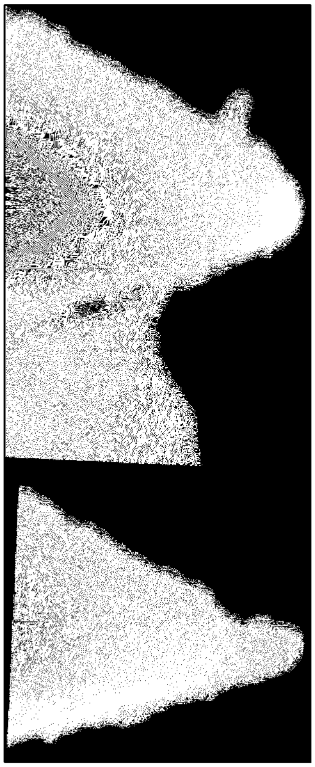
Figure 7D:
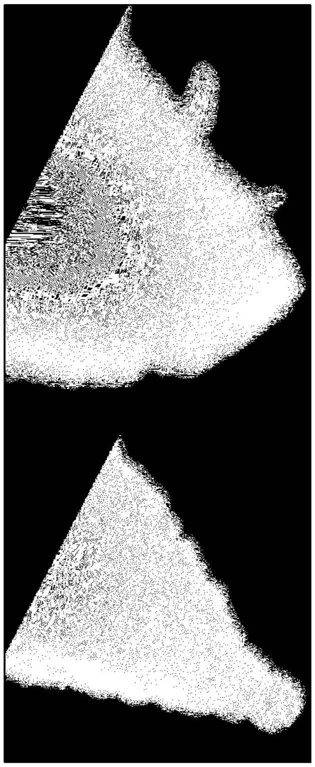

Nonlimiting example chips cut using example methods with an AFM probe vary in length from 1.6-961 μm and in average width from 0.4-0.75 μm. Ribbon chips, washer-type helical chips, and tubular chips can be generated. An example of each chip type is shown in FIG. 6A-6C.

For short, single tool pass cuts, wear increases significantly with increased cutting load and with increasing mounting angle. Furthermore, significant tool fracture can occur at high mounting angles. Wear radius increases with increased load at low speeds and high mounting angles or at high speeds and low mounting angles. Conversely, wear radius decreases with increased load at low speeds and low mounting angles or high speeds and high mounting angles. At high mounting angles, the tip can experience fracture and can appear sharp while being unsuitable for cutting.

Groove depth, the distance between the original surface and the lowest point in the groove, generally decreases with increased mounting angle, increases with increasing load at a low mounting angle, and decreases with load at a higher mounting angle and high cutting speed. The change in groove width (how wide the groove is at the level of the original surface) with cutting conditions follows similar trends.

Comparison of groove skewness (indicates the amount of asymmetry in the groove) and kurtosis (indicates how square versus peaked the groove is) shows that squarer grooves tend to be very symmetric, while more peaked grooves tend to be more skewed. Burr height (an estimate of the height of a burr had it not folded over) is highly dependent on mounting angle at high speeds but not at low speeds. Burr height increases with load at low speed but decreases with load at high speed. Hence the interaction of speed with load and speed with mounting angle is significant.

In machining, rake angle has a strong influence on cutting forces and the quality of cut surfaces, and thus it is helpful to understand the effective rake angles present in scribing (e.g., AFM-based scribing).

FIG. 7A-7D shows SEM images of selected AFM tips before and after cutting. In each image, the new tip is shown on the left, and the same tip after wearing is shown on the right. The left face of each tip is the rake face, and each tip is shown orientated how it would have been during cutting if the workpiece was moving from left to right across the page. The cutting edge is the lowest point in each image.

If the cutting edge is assumed to be infinitely sharp, the resultant ideal rake angle would be defined as shown in FIG. 8A-8B. This value is listed in Table 1 for each new and used tip. However, the cutting edge radii of both the new and worn AFM tips, given in Table 1, are large relative to the depth of cut. Therefore, the effective rake angle is more negative than the ideal rake angle.

TABLE 1

Calculated rake angles during scribing

| Test | Spd. (mm/min) | Mnt. Ang. (deg) | Nom. Load (mN) | Ideal Rake (deg) New | Ideal Rake (deg) Worn | Tip Radius (μm) New | Tip Radius (μm) Worn | Effective Rake (deg) New | Effective Rake (deg) Worn |
|---|---|---|---|---|---|---|---|---|---|
| 2A | 25 | 5 | 0.25 | −17.9 | −18.3 | 0.15 | 0.13 | −87.1 | −84.4 |
| 2B | 25 | 5 | 0.5 | −19.0 | −19.0 | 0.19 | 0.45 | −40.5 | −53.0 |
| 2C | 25 | 30 | 0.25 | 10.3 | 10.3 | 0.16 | 0.39 | −71.5 | −79.7 |
| 2D | 25 | 30 | 0.5 | 9.4 | 9.3 | 0.17 | 0.21 | −78.4 | −46.8 |
| 2E | 15 | 5 | 0.25 | −14.7 | −14.7 | 0.17 | 0.33 | −64.2 | −70.4 |
| 2F | 15 | 5 | 0.5 | −18.9 | −18.9 | 0.13 | 0.22 | −66.7 | −68.8 |

TABLE 1-continued

Calculated rake angles during scribing

| Test | Spd. (mm/min) | Mnt. Ang. (deg) | Nom. Load (mN) | Ideal Rake (deg) | | Tip Radius (µm) | | Effective Rake (deg) | |
|---|---|---|---|---|---|---|---|---|---|
| | | | | New | Worn | New | Worn | New | Worn |
| 2G | 15 | 30 | 0.25 | 11.0 | 11.0 | 0.20 | 0.22 | −69.3 | −54.1 |
| 2H | 15 | 30 | 0.5 | 8.6 | 7.6 | 0.19 | 0.75 | −81.1 | −83.7 |

Figure 8:
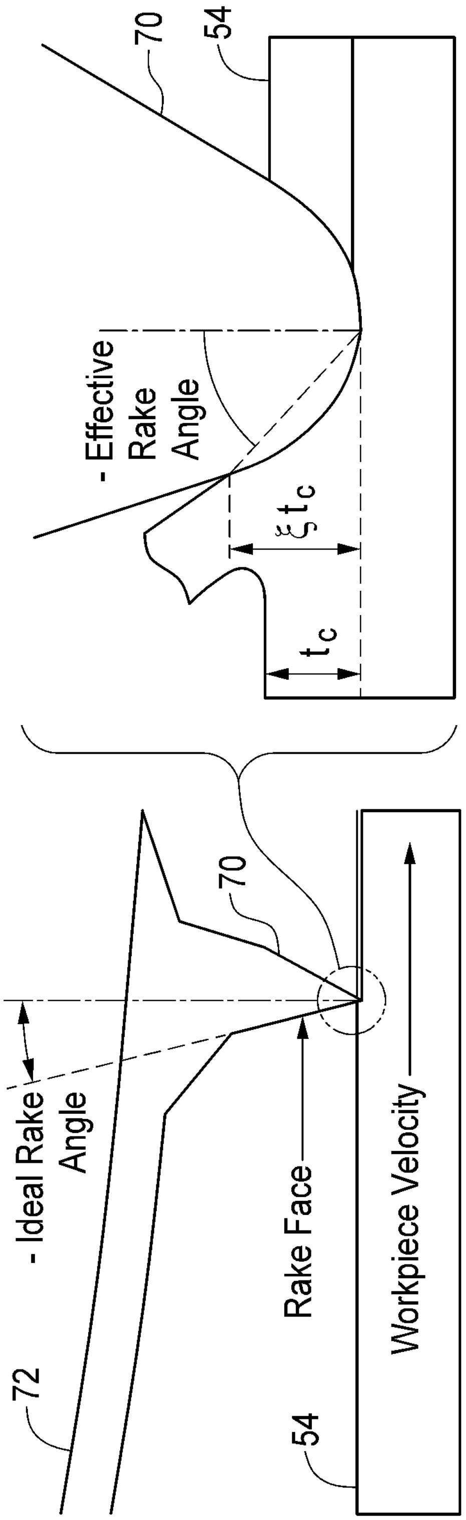
FIG. 8 shows an example calculation of effective average rake angle for an AFM-based tool tip.

Vogler, M. P., "On the Modeling and Analysis of Machining Performance in Micro-Endmilling," PhD. Thesis, University of Illinois, Urbana, Ill., 2003, estimated the effective rake angle during micro-scale cutting simulations by drawing a line between the lowest point on the tool and the point on the cutting face where the chip separates from the tool. The point of tool-chip separation can be estimated as some multiple $\xi$ of the uncut chip thickness $t_c$, as shown in FIG. 8. In Vogler, the uncut chip thickness multiple $\xi$ was assumed to be 1.5. This same calculation was applied to each oriented AFM tip profile in order to calculate the effective rake angle shown in FIG. 8. Also, the uncut chip thickness was assumed to be equal to the corresponding mean groove depth. The resultant effective rake angles are listed in Table 1.

As can be seen in Table 1, the ideal rake angle could be either positive or negative depending on the mounting angle. However, the most positive effective rake angle, −40.5°, occurred when a high speed, low mounting angle, and high load was used. This means that the use of a higher mounting angle resulted in a much more positive ideal rake but the effective rake could be more negative. Also, the highly negative rake angles observed suggest that, despite significant chip formation, a large amount of ploughing also occurred, which is supported by the presence of side burrs. The number of tool passes can have a significant effect of chip morphology.

A high mounting angle of 30° generally results in much higher wear than a low mounting angle of 5°, which may be due to tool fracture. This is also true of a more moderate mounting angle of 15°. This angle approaches that of a typical commercial AFM, which uses a mounting angle of about 13°. Furthermore, a best case of groove formation occurred at a high load. Increased cutting speed did not result in any additional wear, provided that a low mounting angle was used. Also, loads that are too low can result in significant burr formation, but not a clear groove. This is likely due to severe ploughing, since the depth of cut will be small relative to the chip radius, i.e., due to the minimum chip thickness. Therefore, successful cutting with a DT-NCHR diamond-coated AFM probe may be possible using even higher loads and higher cutting speeds if a low mounting angle is used. Initial wear of the AFM probe can likely be reduced through the use of an AFM tip that converges to a chisel edge, with plenty of material supporting the cutting edge, as opposed to a pointed tip.

Cutting conditions resulting in low wear and good groove formation were provided by cutting short straight grooves. However, for many manufacturing applications, a curved groove may be desirable. The example system 50 allows formation of a curved groove, for example by rotating the workpiece 54 during contact with the tool 68.

Figure 9A:
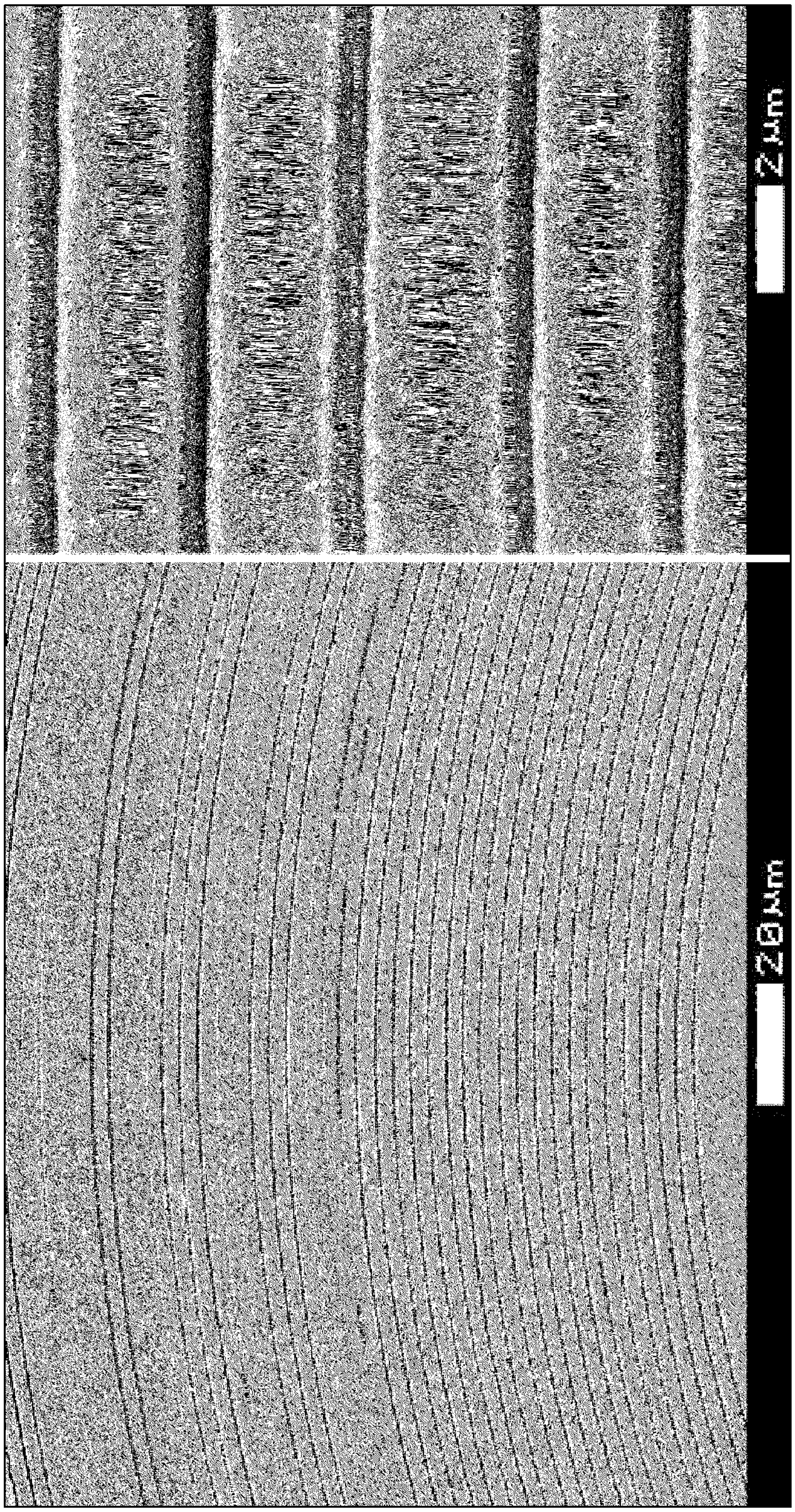
FIG. 9A shows SEM images of an example groove cut in a spiral pattern.
Figure 9B:
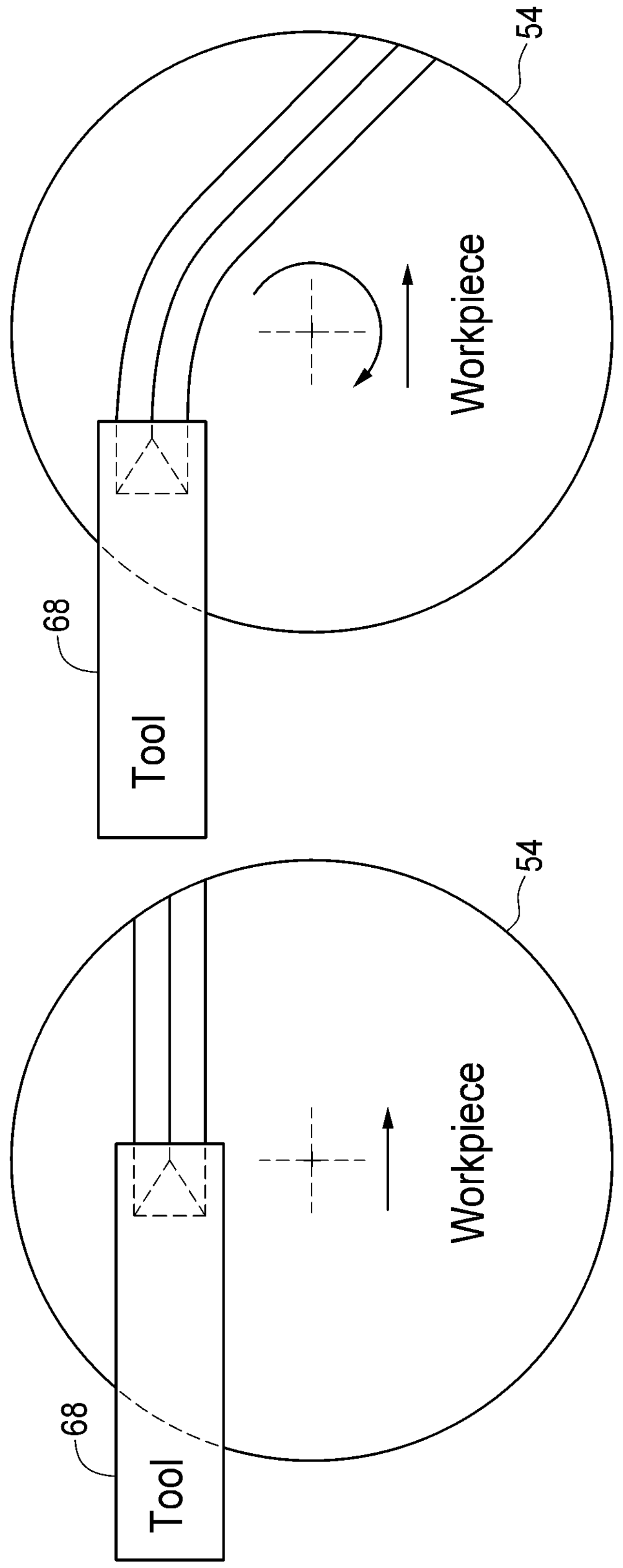
FIG. 9B shows an example movement of a workpiece and a cutting tool to produce a curvilinear groove in the workpiece.
Figure 10:
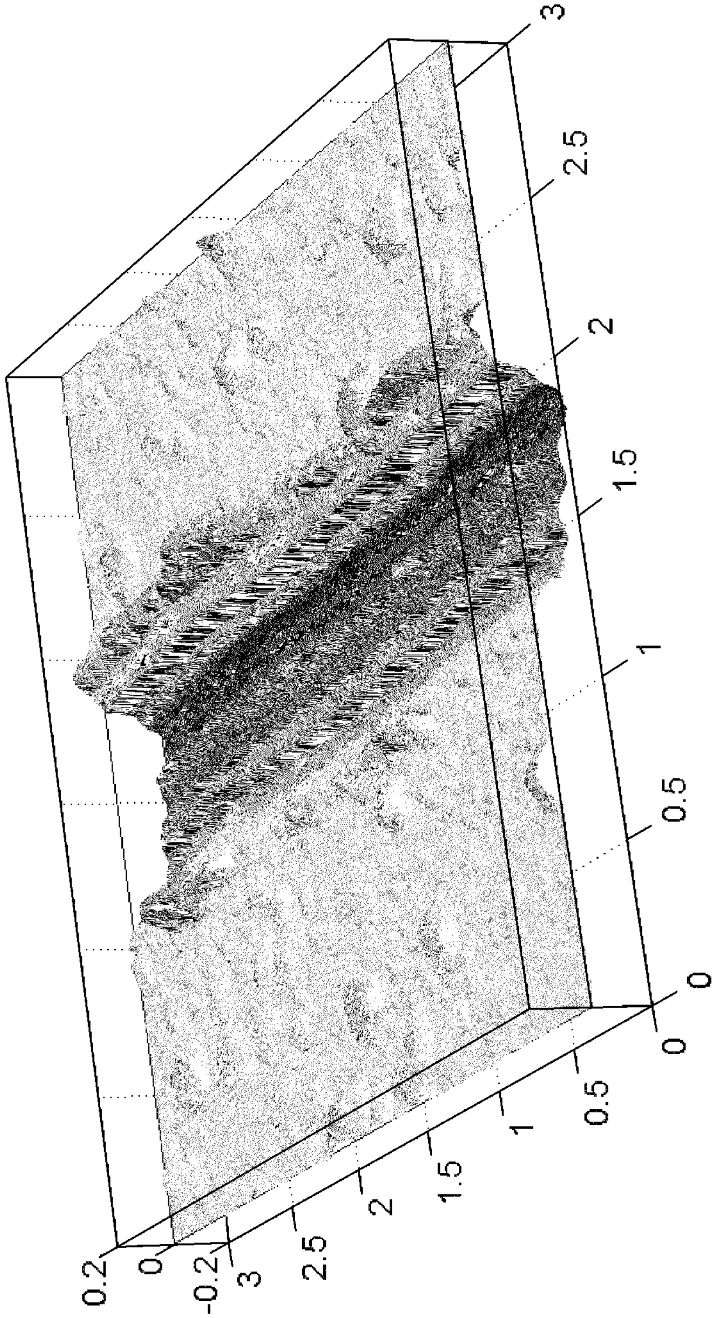
FIG. 10 shows an AFM image of a spiral-shaped groove section.

In a nonlimiting example method for cutting a curvilinear groove, using a speed of 25 mm/min, a mounting angle of 5°, and a nominal load of 0.5 mN, the translational stages and the workpiece rotary stage were used to cut a continuous spiral pattern. The inner radius of the resulting spiral was 236 µn, the spacing between revolutions was 3 µm, and groove length was 82 mm. A section of the spiral shaped groove is shown in FIG. 9A. The groove curvature is clearly visible, and the groove is both well-formed and continuous. AFM images were taken of sections from the first fifteen revolutions of the groove, i.e., over the first 24 mm. FIG. 9B shows an example of movement of the workpiece 54 to provide a curvilinear groove. An AFM image from the first revolution in FIG. 9A is shown in FIG. 10.

The bottom of the spiral-shaped groove is tilted slightly so that the deepest part of the groove was on the side of the groove centerline closer to the center of the spiral. This can be seen in FIG. 10. This can occur if, for instance, forces generated during the cut transverse to the direction of cut cause the cantilever to twist. This tilt can possibly be corrected by using a tool tip with appropriate side relief angles to minimize forces on the tool due to contact with the groove sidewall, or by using a more torsionally-stiff cantilever.

Grooves as long as 82 mm with depths up to 0.29 µm can be cut in example embodiments using a single tool pass and cutting speeds at least as high as 25 mm/min. Generally, groove formation involves significant chip formation. However, ploughing can occur, particularly at low load levels or when conditions give rise to highly negative effective rake angles. Groove geometry is highly dependent on cutting conditions. Well-formed grooves and good tool wear can be achieved using a high cutting speed, a high cutting load, and a low AFM probe mounting angle. Multiple tool passes do not increase groove depth significantly but are likely responsible for improved consistency in groove depth along its length. Tool wear occurs either gradually or by the sudden appearance of a large fracture depending on cutting conditions. When wear occurs gradually, there may be a short initial period of fast wear followed by a long period of very slow wear.

While commercially available diamond coated silicon AFM probes can be used in example embodiments, the shapes of such commercial probes are typically optimized for metrology and not strength. Therefore, early during cutting, part of the AFM tip on each probe can wear away very quickly or even fracture, and the resultant tool that performs subsequent cutting can have an unpredictable shape. Additionally, the probes are typically pyramid shaped, which means that grooves with rectangular cross-sections cannot be cut. Further, the rake angle and clearance angle of commercial AFM probes cannot be specified. Also, the effective rake angle can be increased by increasing the mounting angle of the probe, but without a sufficiently structurally strong tool this tends to only result in tip fracture. Chip snarling can be an issue as well when cutting with an AFM tip.

Accordingly, additional example embodiments provide cutting tools for use with microscale and nanoscale machining systems, such as those provided herein, by modifying existing AFM probes, for example silicon AFM probes, using focused ion beam (FIB) machining. Such probes can be optimized for cutting exclusively, and in such cases they likely would not be suitable for metrology. Thus, these example modified probes are referred to herein as AFM probe-based micro-planing tools.

Example AFM probe-based micro-planing tools according to example embodiments can be configured to achieve one or several criteria to improve cutting performance. It is preferred that example AFM probe-based microplaning tools be structurally strong enough to avoid fracture during cutting. Each tool preferably has a sharp cutting edge so that the effective rake angle is not determined solely by the edge radius and depth of cut. This also reduces the minimum chip thickness and hence promotes more chip formation. Also, each tool preferably comprises clearance faces that avoid excessive rubbing between the tool and workpiece. Further, example tools are designed to minimize chip snarling. This can involve, for example, a change in edge radius/rake angle that results in discontinuous chip formation or incorporation of a chip breaker geometry. Additionally, it is preferred that such tools be producible using a minimum number of cuts on an FIB machine.

Figures 11A, 11B, 11C:
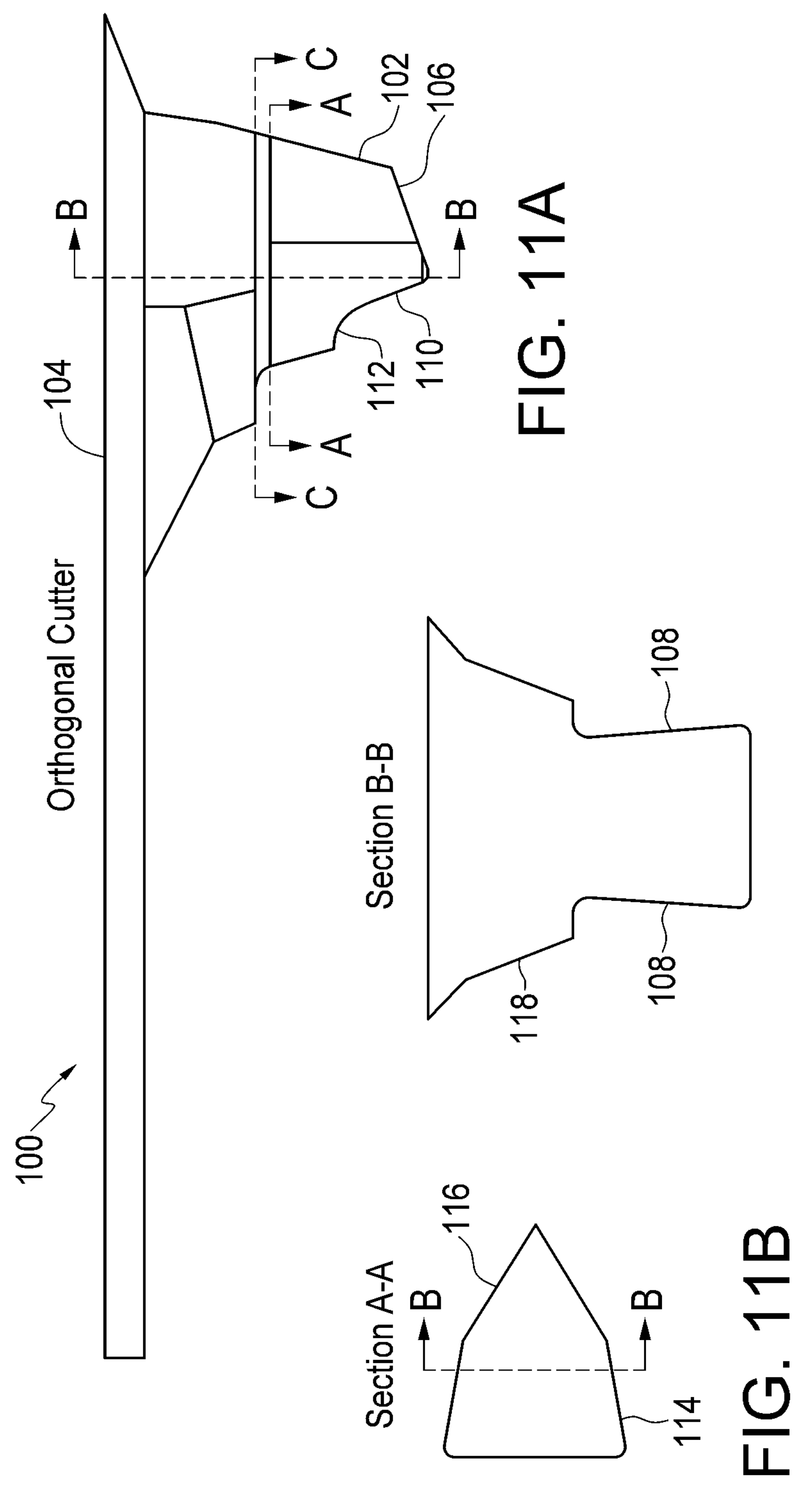
FIG. 11A is a side elevation view of an example orthogonal modified AFM probe-based micro-planing tool according to another embodiment of the present invention.
FIG. 11B is a section taken from A-A in FIG. 11A and in the direction indicated.
FIG. 11C is a section taken from B-B in FIG. 11A and in the direction indicated.
Figure 12A:
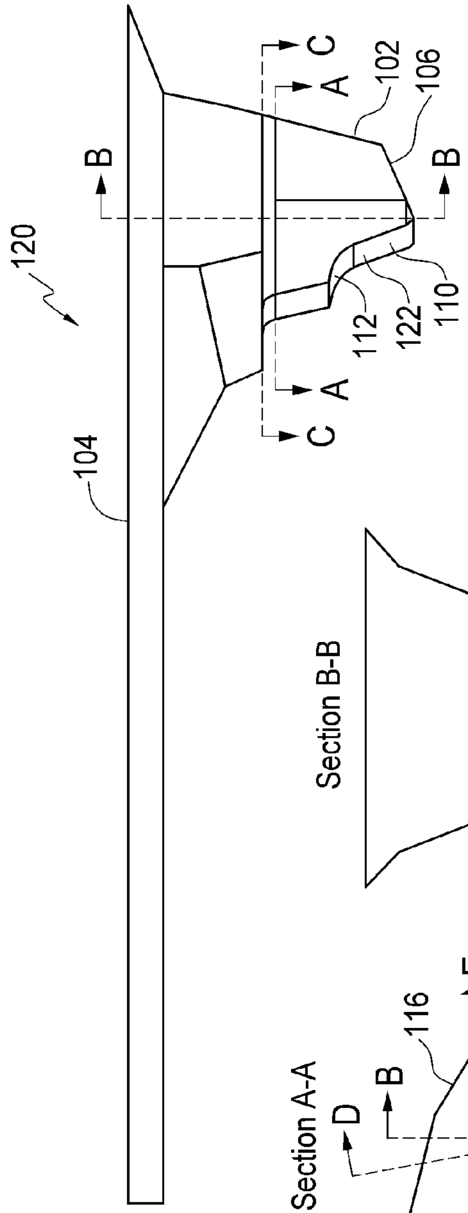
FIG. 12A is a side elevation view of an example oblique modified AFM-probe based micro-planing tool according to another embodiment of the present invention.
Figure 12C:
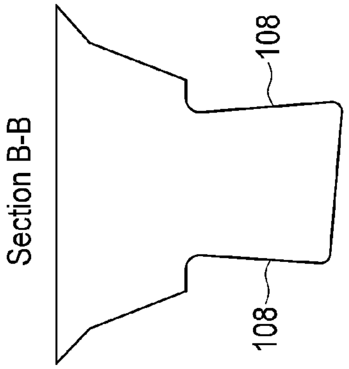
FIG. 12C is a section taken from B-B in FIG. 12A and in the direction indicated.
Figure 12B:
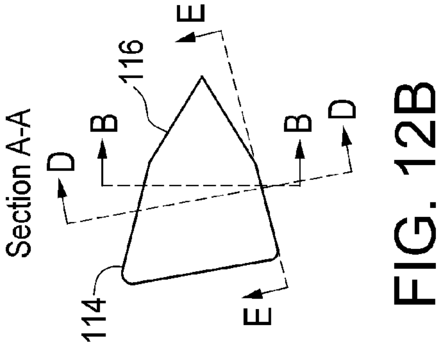
FIG. 12B is a section taken from A-A in FIG. 12A and in the direction indicated.
Figure 12E:
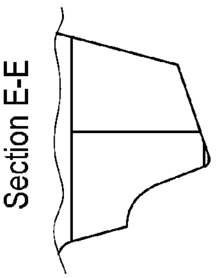
FIG. 12E is a section taken from E-E in FIG. 12A and in the direction indicated.
Figure 12D:
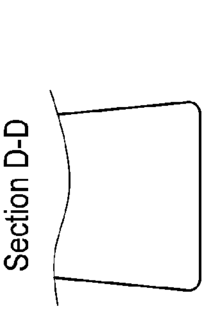
FIG. 12D is a section taken from D-D in FIG. 12A and in the direction indicated.

FIGS. 11A-11C show an example orthogonal AFM probe-based micro-planing tool 100 according to an additional embodiment of the present invention. A tool tip 102 at an end of a flexible cantilever 104 includes an end clearance face 106, a pair of opposing side clearance faces 108, and a rake face 110. Though the example tool 100 is provided by modifying a commercial AFM probe, the portion of the probe above the section marked C-C is unmodified (that is, part of the original AFM tip).

As shown in FIGS. 11A-11C, the example tool 100 includes a small negative back rake angle. This back rake angle can be more positive than the back rake angle present on commercial AFM probes used in other example embodiments. The example back rake angle is still negative, however, because it provides more support for the material at the cutting edge, reducing the chance of fracture. A negative back rake is also selected to avoid cutting forces that may cause the tool 100 to dig uncontrollably into soft material such as aluminum given the flexibility of the cantilever 104. Zero degree angles and positive angles may also be used, however. A constraint on the positive angle is the tool strength.

A radius 112 is provided shown immediately above the rake face 110, which acts as a chip breaker. A radius-type chip breaker is preferred over a ramp-shaped chip breaker because the radius will result in a smaller stress concentration factor compared to the sharp corners involved with having a ramp. A notch-type chip breaker is also possible. It is also contemplated that the tool 100 can be provided with the chip breaker 112 omitted.

FIG. 11B shows a side relief angle 114, which is provided for minimizing rubbing between the side of the tool 100 and the groove. This relief angle 114 is helpful, for example, when cutting a radius in order to avoid twisting the tool. Additionally, a tool trailing edge 116 in the example tool 100 converges to a point due to existing AFM tip geometry. If the tool is not based on a modified AFM tip and/or FIB cuts are made differently, the tool trailing edge need not converge to a point. A second side relief or taper relief 118 (FIG. 11C) is also provided for further minimizing rubbing between the side of the tool and the groove.

The example tool 100 can be produced using three FIB cuts. The first cut is made looking at the side of the AFM probe, resulting in formation of the back rake and end clearance face. The second cut is made looking at the front of the probe at a slight angle, and results in the formation of one of the side clearance faces. The third cut is made looking at the front of the probe at a slightly different angle, and results in the formation of the other side clearance face.

In an example FIB method using a diamond cutting tool, four through cuts are used. The first cut forms the rake and end clearance faces. The second and third cuts form the side clearance faces. The fourth cut intersects the rake face to form the cutting edge. This last cut is made because, when cutting through a piece of materials, a sharper edge is formed on the side furthest from the ion source. However, if a rake face shape such as a v-shape or curved shape does not lend itself to the use of a fourth cut, that step can be eliminated at the cost of a somewhat larger cutting edge radius.

FIGS. 12A-12E show a cutting tool 120 having another example probe geometry according to an embodiment of the present invention that is similar to the tool 100 shown in FIGS. 11A-11C, and indicated with like reference characters, but in which a side rake angle 122 is further provided to guide chips off to the side during cutting. The side rake angle 122 provides an oblique cutter. FIB machining can be carried out in much the same way as with the tool 100, except that the tool 120 would be rotated slightly when making the first cut.

During cutting with a cutting tool 68, 100, 120 such as a commercially available or modified AFM probe, the cantilever 72 will deflect due to cutting forces and the applied load normal to the workpiece 54 surface. The cantilever deflection changes the orientation of the cutting geometry of the tool. It is useful for the cutting and relief faces of the tool to remain in a single orientation regardless of the applied load, which is the situation that normally occurs with rigid cutting tools. In this way, rake angles and clearance angles could be specified during tool design independently of how the tool will be loaded.

To accomplish a uniform cutting geometry operation in an example embodiment, the end of the bent cantilever 72 (e.g., an AFM cantilever) should be at the same orientation relative to the workpiece 54 at all times. This can be accomplished by adjusting the mounting angle of the probe so that a given load will result in the desired orientation. Since the groove cutting assembly 74 is mounted on a rotary stage (B axis stage 64), the mounting angle can easily be varied by rotating that stage.

According to a method of the present invention, the mounting angle required for the end of the bent cantilever to be parallel to the workpiece surface can be calculated using a 2D beam model that accounts for loads applied to the tool tip 70 normal to the workpiece 54, the probe mounting angle, and the location of the cutting edge (contact point) relative to the end of the cantilever 72. As an example, FIG. 13 shows a mounting angle required to obtain a desired cantilever end orientation at different loadings when a cantilever is taken to be 30 μm wide, 125 μm long, and either 4 or 4.5 μm thick. It can be seen in FIG. 13 that the thickness of the cantilever 72 has a large effect on this angle. By contrast, the location of the cutting edge relative to the end of the cantilever does not have a very large effect. The location of the cutting edge is described by both an x-coordinate XT and a y-coordinate YT where the x-axis is coincident with the end of the axis of the cantilever. Only XT is varied in the plot because the required mounting angle was found to be insensitive to changes in YT.

Using similar calculations, a uniform cutting geometry can be insured during steady state cutting for any combination of cantilever and FIB machined cutting geometry on its end. However, when the load is being ramped up to the desired value, the cutting geometry will experience transient orientations. If cutting is occurring during this period, i.e., depth of cut is being ramped up during a cut, the cutting edge should still be the only contact point between the tool and the workpiece, and the clearance face should not rub against the workpiece. Therefore, the end clearance angle should be greater than the mounting angle used. Based on FIG. 13, it is therefore desirable to have a clearance angle of at least 10° to satisfy this condition for the example cantilever geometry, assuming that the applied load does not exceed 0.575 mN.

Figure 14:
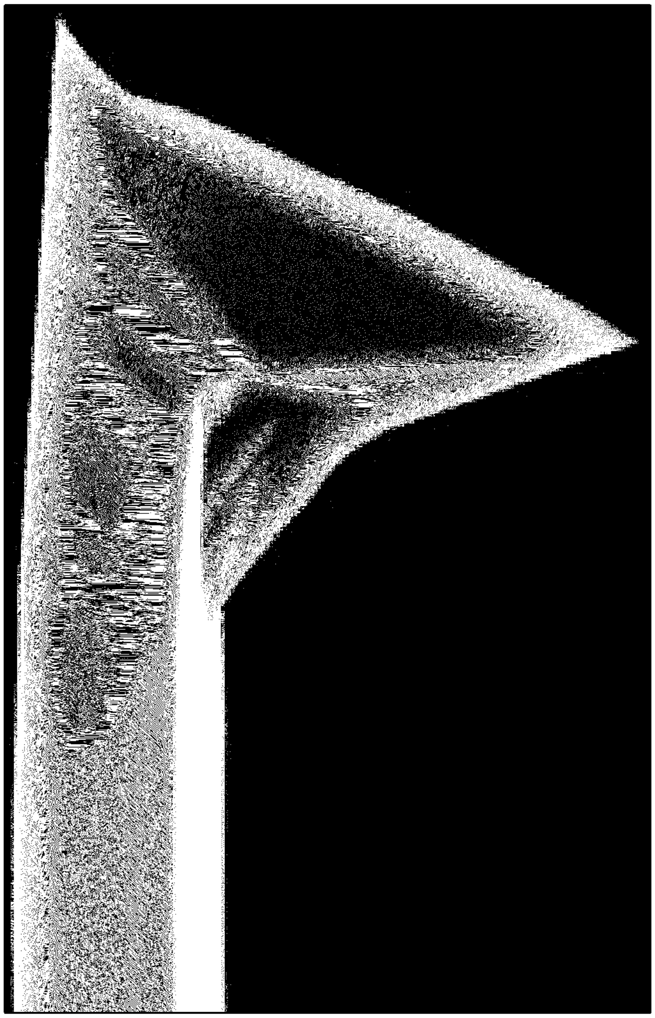
FIG. 14 shows an unmodified NCHR AFM tip.
Figure 15A:
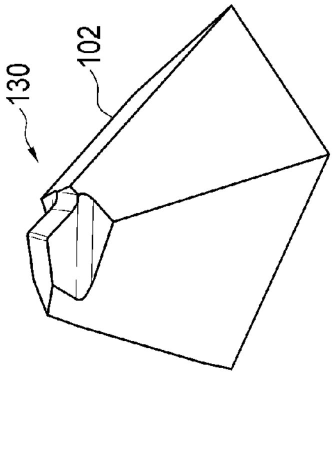
FIGS. 15A-15C show a simplified cutter tool geometry having a chip breaker and being formed from two FIB cuts of the AFM tip of FIG. 14, according to an embodiment of the present invention.
Figure 15B:
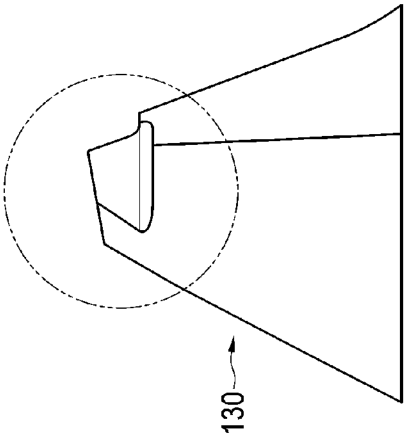
Figure 15C:
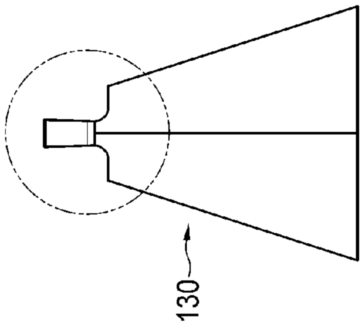

FIG. 14 shows an unmodified NanoWorld Probepoint® NCHR AFM probe examined using an SEM, and FIGS. 15A-15C shows a simplified cutter design 130 provided by modifying the AFM probe. In an example method, a 3D CAD model was made of the top 8 μm of the AFM tip, and the CAD model was then used to design the simplified tool 130. The overall design of the simplified tool 130 is similar to the one shown in FIGS. 11A-11C except that there is no chip breaker radius and no side relief. The simplified design also reduces the number of required FIB cuts in an example fabrication method to only two. An example back rake angle is −20°, and an example end clearance angle is 10°. The width of an example cutting tool is 0.5 μm and the height (max possible depth of cut) of the example cutting tool is 1.0 μm.

Figure 16A:
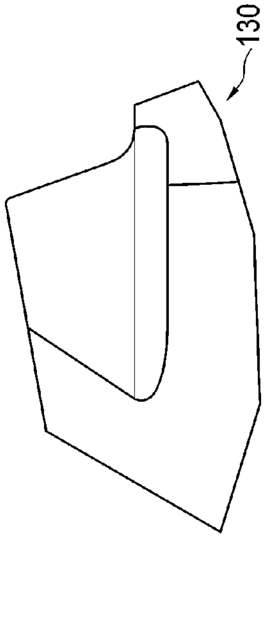
FIGS. 16A-16B show orientations of the simplified cutter tool of FIGS. 15A-15C during a first FIB cut and a second FIB cut, respectively.
Figure 16B:
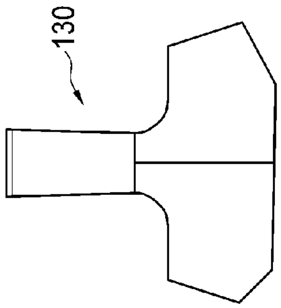
Figure 17B:
FIGS. 17A-17C show SEM images of the top of the example simplified cutter geometry and cantilever (FIG. 17A), the top of the cutter geometry (FIG. 17B), and a front view of the cutter geometry (FIG. 17C)
Figure 17C:
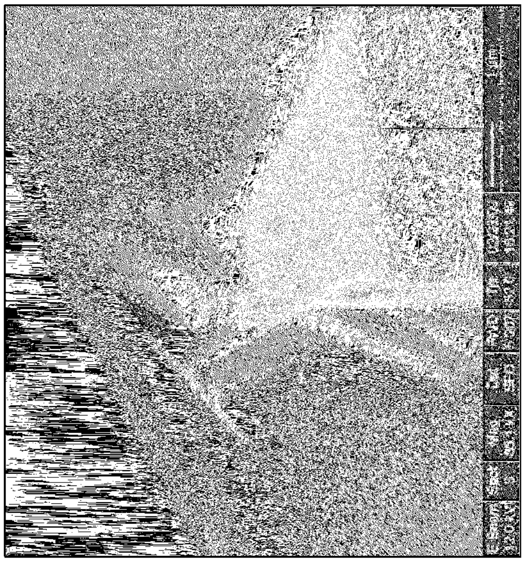
Figure 17A:
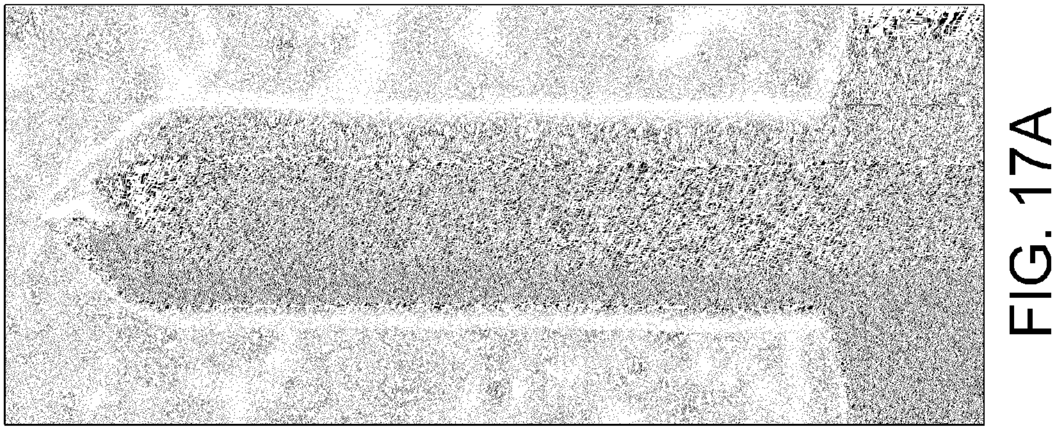

The example simplified tool design was constructed by modifying a silicon NCHR AFM probe using two cuts performed by FIB machining. FIG. 16A shows the profile created during the first cut and FIG. 16B shows the profile created during the second cut. There is a little rounding on the side of the tool that is introduced during the first cut due to the Gaussian nature of the ion beam distribution, but this is acceptable since the rounded areas are removed during the second cut. During the second cut there was also some rounding, but this occurred on the face on the opposite side of the tool from the rake face, and hence was not significant. FIG. 17A-17C are SEM images of the example cutter geometry and cantilever for the simplified tool 130. An example cutting edge radius for the simplified tool 130 is 58 nm. Cutting using the example tool 130 showed reduced rates of fracture. It is contemplated that a larger clearance angle can be used for the tool 130 to reduce wear of the material on the clearance face. Also, a sufficient side angle or more torsionally stiff cantilever may be used to reduce torsional forces on the tool 130.

Figure 18A:
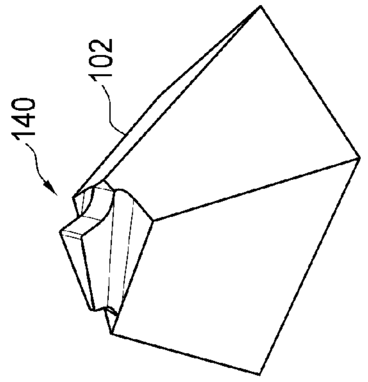
FIGS. 18A-18G are a perspective view, a cut front view, a top view, a side view, a front view, an enlarged top view, and an enlarged side view, respectively, of a cutting tool incorporating side relief angles, according to another embodiment of the present invention.
Figure 18B:
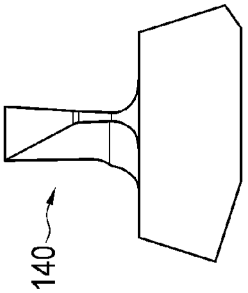
Figure 18C:
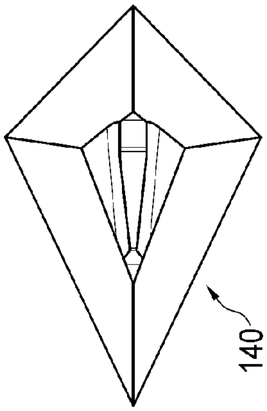
Figure 18D:
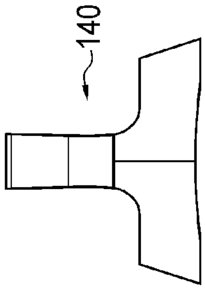
Figure 18E:
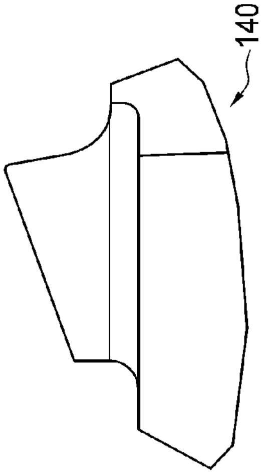
Figure 18F:
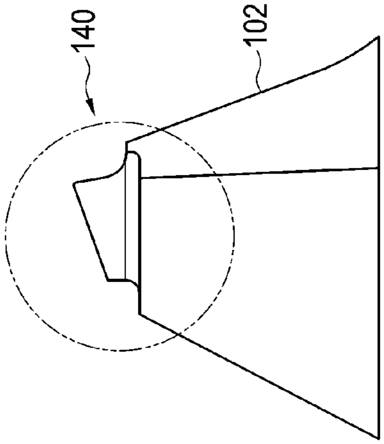
Figure 18G:
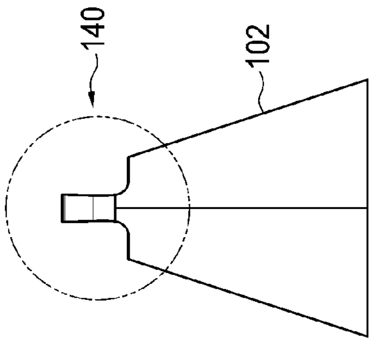
Figure 19A:
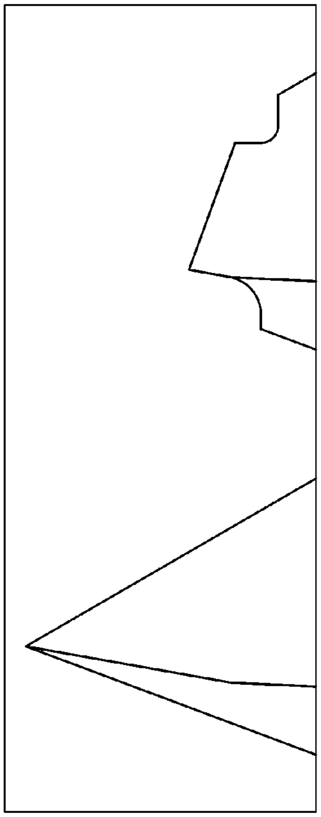
FIGS. 19A-19C show views of the cutting tool of FIGS. 18A-18G during a first cut, a second cut, and a third cut, respectively.
Figure 19B:
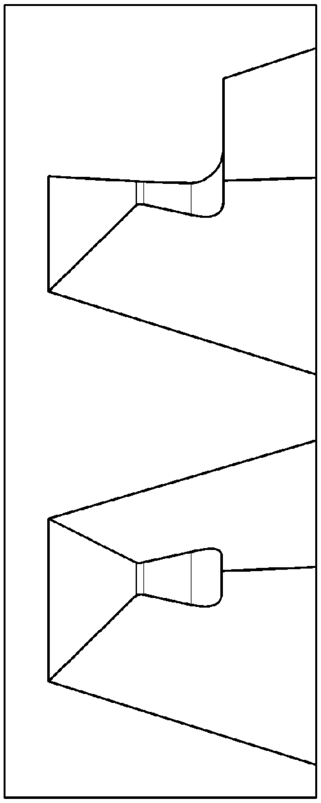
Figure 19C:
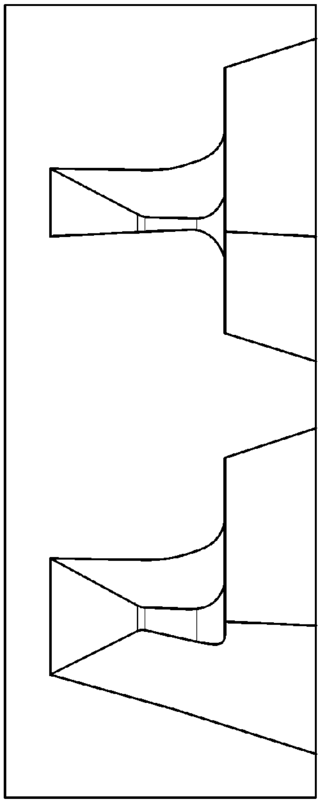

A tool 140 according to another embodiment of the present invention is similar to the tool 130, but further includes a 5 degree side relief angle 142 on both sides of the rake face to improve straightness of cut. Also, to keep the clearance face of the tool from rubbing against the workpiece, the end clearance angle is increased from 10 degrees to 20 degrees. This design is shown in FIGS. 18A-180. Due to the increased complexity of this tool 140, three FIB cuts are used for fabrication instead of just two. The first cut, shown in FIG. 19A, produces the rake and end clearance faces. In the image, the AFM tip prior to FIB cutting is shown on the left, and after cutting is shown on the right. The second cut, shown in FIG. 19B, produces one side clearance face of the tool. The third cut, shown in FIG. 19C, produces the other side clearance face. Particular embodiments of the tool 140 include back rake angles of −20° and −10°, widths varying from 0.56 μm to 0.59 μm, side relief angles from 6.2° to 8.0°, and edge radii from 35 nm to 67 nm. All variations except for the different rake angles can be provided by variations in the FIB machining process.

Figure 20:
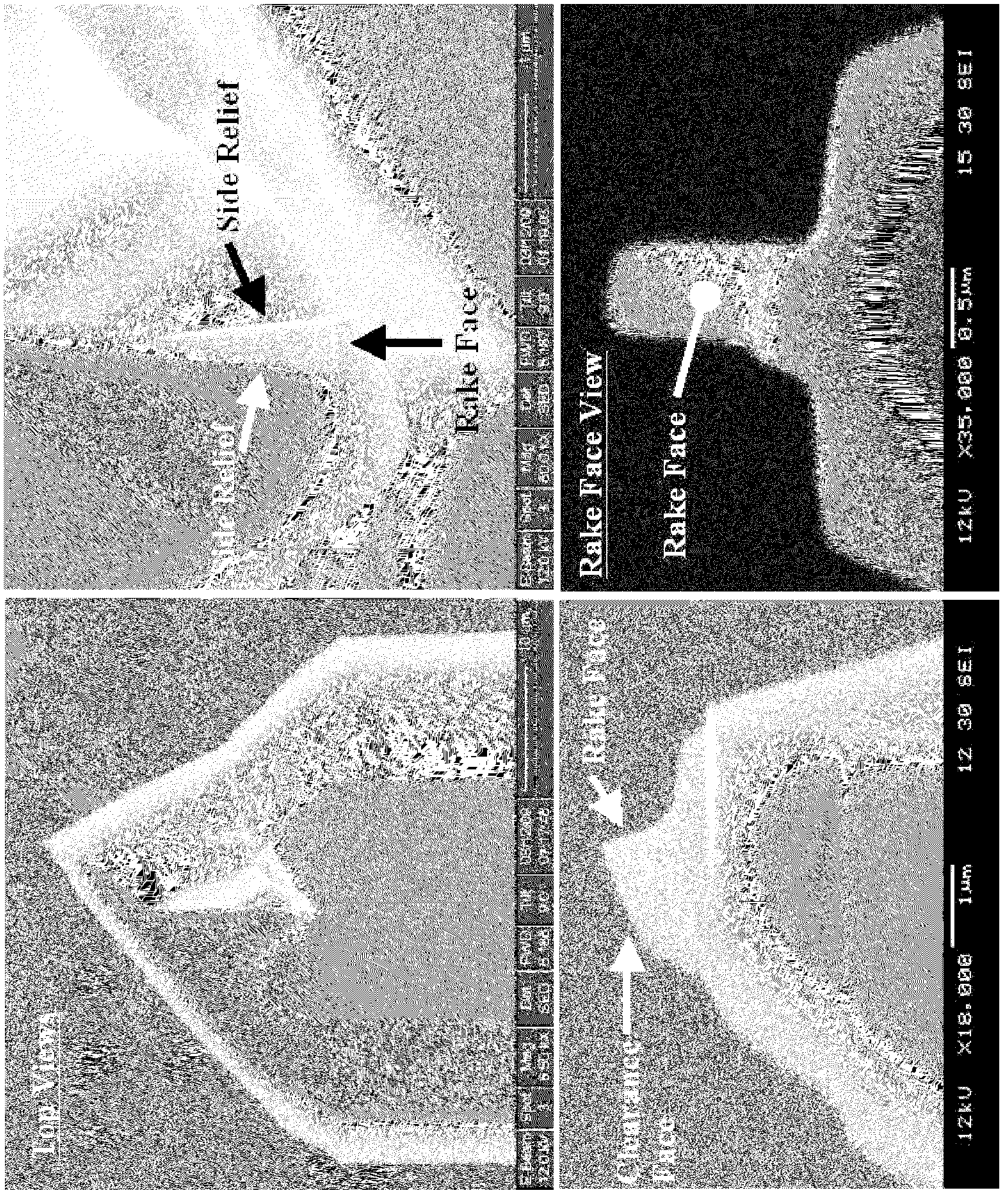
FIG. 20 shows an example cutting tool such as shown in FIGS. 18A-18G with a −20 degree back rake angle.
Figure 21:
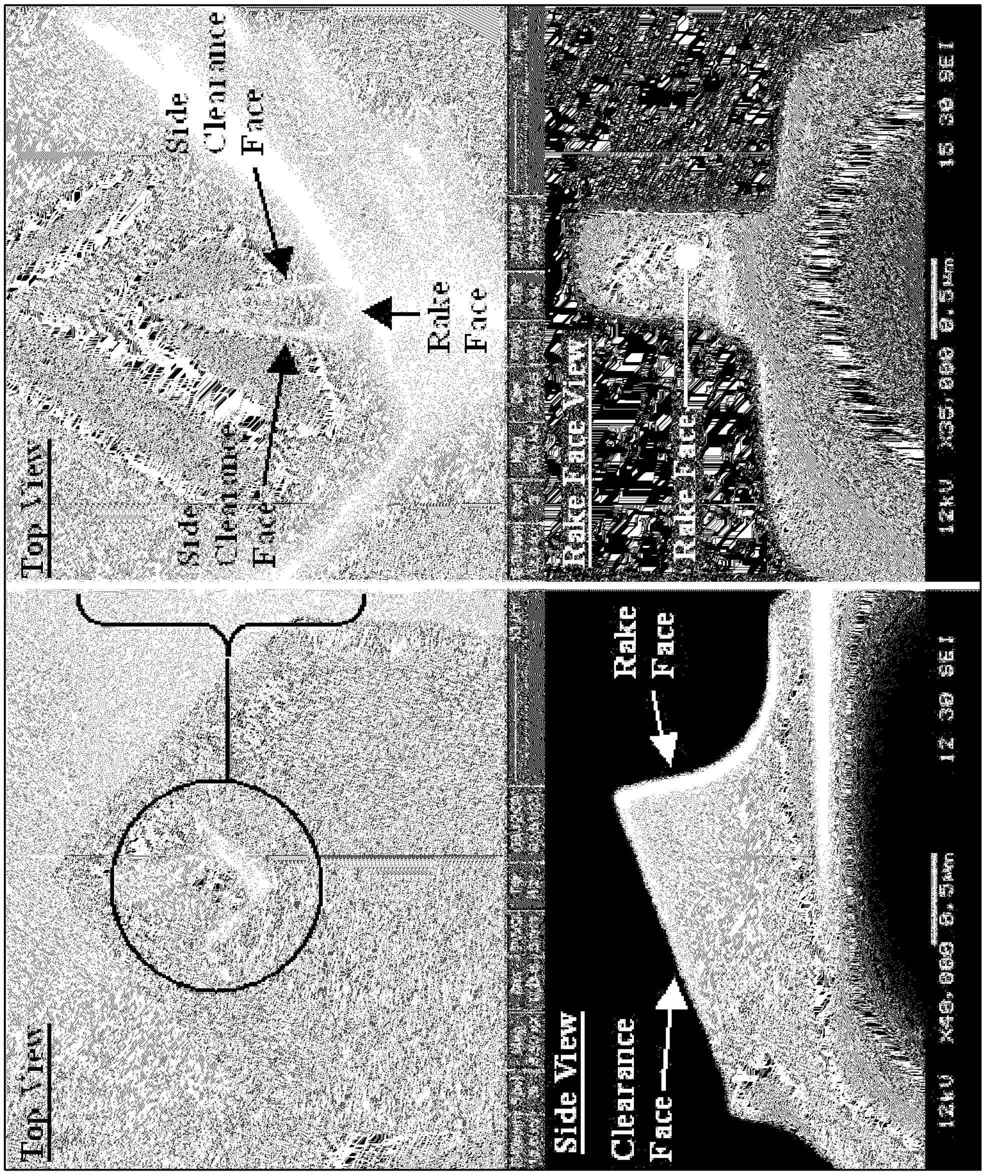
FIG. 21 shows an example cutting tool such as shown in FIG.

FIG. 20 shows an example of a tool machined with a −20° back rake angle, and FIG. 21 shows an example of a tool machined with a −10° back rake angle. As can be seen in the SEM images, the cutting edge on each tool was well formed and fairly small. The back rake and end clearance angles were also good. The profiles of the cutting faces were somewhat rounded near the cutting edges, particularly the sides that faced the ion beam when the back rake and clearance faces were cut. Thus, the profile cut by the tool should be somewhat rounded, even before any tool wear. Straight grooves were cut with examples of the tool 140 at a cutting speed of 25 mm/min, a mounting angle of about 7°, which resulted in the end of the cantilever being approximately parallel to the workpiece surface, and an applied load of 0.5 mN. Making the tools 100, 110, 120, 130, 140 of a harder material or coated with a harder material, such as but not limited to silicon nitride, aluminum oxide, and diamond, will improve tool wear resistance.

As opposed to conventional AFM scribing, example embodiments of the present invention can provide cuts that are much longer, with a much faster scribing speed to achieve a good production rate. These longer cuts can result in uninterrupted chip formation, unlike in cases where the cut is only a few microns long. A large tip and edge radii, due to coated (e.g., diamond coated) probes, and large cutting speed involve scribing loads on the order of several hundred μN (for example), which are larger than typically used in conventional AFM scribing.

Example embodiments can provide a microscale or nanoscale machining process that can cut relatively long freeform grooves at high speeds on relatively large workpiece areas. Example applications of the invention include: MEMS (micro-electromechanical systems) device fabrication; maskless lithography; manufacturing hot embossing molds; manufacturing microfluidic devices with very narrow and shallow channels in a wide range of materials; fabricating reflective optics based lithography masks by scratching thin reflective coatings off a non-reflective substrate; the production of complex surface patterns composed of closely spaced or intersecting grooves for changing surface properties such as hydrophobicity; and creating optically diffractive devices, such as (but not limited to) LCD backlight light guilds, which can include microgrooves with depths of, e.g., 2.5-10 μm separated by 100-250 μm.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A high precision micro/nano scale machining system, comprising:

a multi-axis movement machine providing relative movement along multiple axes between a workpiece and a tool holder;

a cutting tool on a flexible cantilever held by the tool holder;

the tool holder being movable to provide at least two of the axes to set an angle and distance of the cutting tool relative to the workpiece; and a feedback control system that uses measurement of deflection of the cantilever during cutting to set and maintain a desired cantilever deflection and hence a desired load on the cutting tool.

2. The system of claim 1, wherein said feedback control system comprises a control system including a proportional-integral-derivative (PID) control algorithm with feedforward for each of the axes to control the tool holder position to maintain the desired cantilever deflection.

3. The system of claim 1, wherein the desired cantilever deflection is either constant or varied to achieve a desired cutting profile.

4. The system of claim 1, wherein said control system sets the cantilever angle in a manner that achieves a desired cutting geometry orientation during cutting using a 2D model that accounts for loads applied to a tip of the cutting tool normal to the workpiece, the cutting tool mounting angle, and the location of the cutting edge relative to the end of the cantilever.

5. The system of claim 1, wherein said cutting tool and said flexible cantilever comprise a probe of an atomic force microscope (AFM).

6. The system of claim 5, wherein the probe is modified to have a predetermined cutting geometry that provides a back rake face and an end clearance face.

7. The system of claim 1, wherein a cutting tool is shaped to have a predetermined cutting geometry that provides a well defined rake face and that has a shape that enables the machining of a groove with a desired shape, an end clearance face, and side clearance faces;

the cutting geometry being sufficient to withstand the forces applied to it during cutting and to wear in a gradual manner.

8. The system of claim 1, further comprising:

a displacement sensor coupled to said feedback control system for measuring deflection of the cantilever.

9. The system of claim 8, wherein said displacement sensor comprises an optical displacement sensor that detects bent shape of the cantilever and the feedback control system sets and maintains the desired deflection and desired load with reference to the bent shape.

10. A high precision micro/nano scale machining system comprising:

a single or multiple point cutting tool mounted on a flexible cantilever, the cutting tool having a geometry suitable for groove and pocket cutting;

a precision displacement sensor to measure deflection of the cantilever during cutting;

a multi-axis motion platform providing relative x, y, and z axis movements and rotational movements between a workpiece and the cutting tool; and a feedback control system that uses measurement of tool cantilever deflection during cutting to set and maintain a constant cantilever deflection and hence a constant load on the cutting tool.

11. The system of claim 10, wherein the cutting tool is mounted on a tool holder and the tool holder is rotated using a rotary stage in order to achieve a desired cutter orientation when the flexible cantilever portion of the tool experiences deflection.

12. A high precision micro/nanoscale machining system comprising:

a single or multiple point cutting tool mounted on a flexible cantilever, the cutting tool having a geometry suitable for groove and pocket cutting;

a precision displacement sensor to measure deflection of the cantilever during cutting;

a multi-axis motion platform providing relative x, y, and z axis movements and rotational movements between a workpiece and the cutting tool; and a feedback control system that uses measurement of tool cantilever deflection during cutting to maintain a constant cantilever deflection and hence a constant load on the cutting tool, wherein the feedback control system uses a 2D beam model to calculate the amount of rotation required to achieve a desired cutting orientation by accounting for loads applied to the tool normal to the workpiece and the tool geometry.

13. A method of machining a workpiece comprising:

placing the workpiece on a multi-axis movement machine that provides relative movement along multiple axes between a workpiece and a tool holder;

positioning a cutting tool on a flexible cantilever held by the tool holder towards the workpiece, the tool holder being movable to provide at least two of the axes to set an angle and distance of the cutting tool relative to the workpiece;

contacting the cutting tool to the workpiece, wherein a load is provided on the cutting tool and the flexible cantilever is deflected;

moving at least one of said cutting tool and said workpiece to machine the workpiece;

during said moving, measuring deflection of the cantilever; and repositioning the tool holder based on said measured deflection to maintain a desired cantilever deflection and hence a desired load on the cutting tool.

14. The method of claim 13, wherein said repositioning comprises a feedback control system using said measured deflection and controlling said tool holder.

15. The method of claim 13, wherein said feedback control system sets a cantilever angle in a manner that achieves a desired cutting geometry orientation during cutting using a 2D model that accounts for loads applied to a tip of the cutting tool normal to the workpiece, the cutting tool mounting angle, and the location of the cutting edge relative to the end of the cantilever.

16. The method of claim 15, further comprising:

calibrating the measured deflection to a load on the cutting tool.

17. The method of claim 13, wherein said repositioning comprising adjusting a distance of the tool holder relative to the workpiece.

18. A high precision micro/nano scale machining system, comprising:

means for microscale or nanoscale cutting;

flexible cantilever means for supporting said means for cutting;

means for holding said flexible cantilever means;

means for providing relative movement along multiple axes between a workpiece and said means for holding;

said means for providing relative movement comprising means for setting an angle and distance of said means for cutting relative to the workpiece;

means for measuring deflection of said flexible cantilever means; and feedback control mean for receiving said measured deflection and for setting and maintaining a desired deflection of said flexible cantilever means and hence a desired load on said means for cutting.

* * * * *

UNITED STATES PATENT AND TRADEMARK OFFICE

CERTIFICATE OF CORRECTION

PATENT NO. : 8,806,995 B2
APPLICATION NO. : 12/877863
DATED : August 19, 2014
INVENTOR(S) : Kapoor et al.

It is certified that error appears in the above-identified patent and that said Letters Patent is hereby corrected as shown below:

On the Title Page:

Item (56) References Cited

Page 2, Column 1, Lines 7-8

Please delete “www.fanuc.co/jp/en/product/robonano/index.htm.” and insert --www.fanuc.co.jp/en/product/robonano/index.htm.-- therefor.

In the Specification:

Col. 7, line 11 Please delete “workpiece 56” and insert --workpiece 54-- therefor.

Col. 12, line 44 Please delete “orientated” and insert --oriented-- therefor.

Col. 13, line 66 Please delete “μn” and insert --μm-- therefor.

In the Claims:

Claim 17, Col. 20, line 35 Please delete “comprising” and insert --comprises-- therefor.

Claim 18, Col. 20, line 50 Please delete “mean” and insert --means-- therefor.

Signed and Sealed this
Thirty-first Day of March, 2015

Michelle K. Lee

Michelle K. Lee
*Director of the United States Patent and Trademark Office*